(12) United States Patent
Horikoshi

(10) Patent No.: US 10,186,691 B2
(45) Date of Patent: Jan. 22, 2019

(54) BATTERY AND ASSEMBLED BATTERY

(71) Applicant: MURATA MANUFACTURING CO., LTD., Kyoto (JP)

(72) Inventor: Yoshiichi Horikoshi, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 211 days.

(21) Appl. No.: 15/030,418

(22) PCT Filed: Nov. 18, 2014

(86) PCT No.: PCT/JP2014/005791
§ 371 (c)(1),
(2) Date: Apr. 19, 2016

(87) PCT Pub. No.: WO2015/087492
PCT Pub. Date: Jun. 18, 2015

(65) Prior Publication Data
US 2016/0260939 A1    Sep. 8, 2016

(30) Foreign Application Priority Data
Dec. 13, 2013  (JP) .................................. 2013-258706

(51) Int. Cl.
*H01M 2/02* (2006.01)
*H01M 2/06* (2006.01)
(Continued)

(52) U.S. Cl.
CPC ........... *H01M 2/022* (2013.01); *H01M 2/021* (2013.01); *H01M 2/0275* (2013.01); *H01M 2/06* (2013.01);
(Continued)

(58) Field of Classification Search
CPC .......... H01M 2/022; H01M 2/06; H01M 2/30; H01M 2/263; H01M 2/1673;
(Continued)

(56) References Cited

U.S. PATENT DOCUMENTS

| 8,080,329 B1* | 12/2011 | Skinlo ..................... H01M 2/16 429/129 |
| 2003/0170531 A1* | 9/2003 | Bean .................... H01M 2/1055 429/65 |

(Continued)

FOREIGN PATENT DOCUMENTS

| CN | 100341194 C | 10/2007 |
| CN | 102804455 A | 11/2012 |

(Continued)

OTHER PUBLICATIONS

International Search Report mailed in PCT/JP2014-005791, dated Feb. 16, 2015, 4 pages.

(Continued)

*Primary Examiner* — Muhammad S Siddiquee
(74) *Attorney, Agent, or Firm* — K&L Gates LLP

(57) ABSTRACT

There is provided a battery including a substantially cylindrically shaped winding electrode having a hollow portion in the center, and a sheath material having flexibility which sheathes the winding electrode, wherein a width of the hollow portion is 2.5 mm or less.

22 Claims, 20 Drawing Sheets

(51) Int. Cl.
  *H01M 2/16*  (2006.01)
  *H01M 2/30*  (2006.01)
  *H01M 10/0587*  (2010.01)
  *H01M 10/04*  (2006.01)
  *H01M 2/26*  (2006.01)
  *H01M 10/0525*  (2010.01)

(52) U.S. Cl.
  CPC ......... *H01M 2/1673* (2013.01); *H01M 2/263* (2013.01); *H01M 2/30* (2013.01); *H01M 10/0422* (2013.01); *H01M 10/0431* (2013.01); *H01M 10/0525* (2013.01); *H01M 10/0587* (2013.01); *H01M 2220/30* (2013.01)

(58) Field of Classification Search
  CPC ......... H01M 10/0525; H01M 10/0587; H01M 10/0431; H01M 10/0422; H01M 2/0275; H01M 2/021; H01M 2220/30
  See application file for complete search history.

(56) References Cited

U.S. PATENT DOCUMENTS

| | | | |
|---|---|---|---|
| 2005/0003195 | A1 | 1/2005 | Joseph et al. |
| 2005/0031950 | A1 | 2/2005 | Maeda |
| 2006/0121341 | A1* | 6/2006 | Hosoda .................. H01M 2/12 429/161 |
| 2009/0165290 | A1* | 7/2009 | Yu ....................... H01M 2/0275 29/623.2 |
| 2011/0287302 | A1 | 11/2011 | Kim |
| 2012/0308863 | A1* | 12/2012 | Masumoto ............ H01M 2/022 429/94 |
| 2013/0045406 | A1* | 2/2013 | Ahn ................. H01M 10/0431 429/94 |
| 2014/0050967 | A1* | 2/2014 | Fuhr .................... H01M 2/305 429/158 |
| 2015/0147633 | A1* | 5/2015 | Ahn .................... H01M 2/0237 429/176 |
| 2015/0357679 | A1 | 12/2015 | Sano et al. |

FOREIGN PATENT DOCUMENTS

| | | |
|---|---|---|
| JP | S58-010375 A | 1/1983 |
| JP | H01-122574 A | 5/1989 |
| JP | 2000-003722 A | 1/2000 |
| JP | 2000133215 | 5/2000 |
| JP | 2003-017014 A | 1/2003 |
| JP | 2003017014 | 1/2003 |
| JP | 2004-014374 A | 1/2004 |
| JP | 2004014374 | 1/2004 |
| JP | 2006-019214 A | 1/2006 |
| WO | 2008007867 | 1/2008 |
| WO | 2014/132660 A1 | 9/2014 |

OTHER PUBLICATIONS

Office Action for Chinese counterpart Application No. 201480064164.9; dated Oct. 30, 2017; (7 pages).

Japanese Office Action (with English translation) dated Aug. 30, 2016 issued in corresponding Japanese application No. 2013-258706 (16 pages).

Chinese Office Action dated Jun. 8, 2018 in corresponding Chinese Application No. 201480064164.9.

Office Action for European counterpart Application No. 14810000.1; dated Jan. 24, 2018; (5 pages).

Chinese Office Action dated Oct. 30, 2017 issued in corresponding Chinese application No. 201480064164.9.

* cited by examiner

BATTERY AND ASSEMBLED BATTERY

CROSS REFERENCE TO RELATED APPLICATIONS

This application claims the benefit of International Application PCT/JP2014/005791, filed Nov. 18, 2014, which claims the benefit of Japanese Priority Patent Application JP 2013-258706 filed Dec. 13, 2013, the entire contents of which are incorporated herein by reference.

TECHNICAL FIELD

The present technology relates to a battery and an assembled battery. In detail, the present technology relates to a battery equipped with a winding electrode and a sheath material and an assembled battery equipped with the same.

BACKGROUND ART

In recent years, miniaturization and weight reduction of portable devices such as a mobile phone, a portable audio player, and a PDA (Personal Digital Assistant) have been remarkably improved. The miniaturization of the battery to be mounted has played a part of the technology improvement.

As a small battery, a battery in which a flat winding-type electrode body is housed a film-like sheath material with high flexibility in molding has been proposed (for example, see PTL 1). By using such a film-like sheath material, cell design appropriate for portable electronic devices to be diversified is possible. In recent years, miniaturization of batteries using such a sheath material is desired.

CITATION LIST

Patent Literature

PTL 1: Japanese Unexamined Patent Application Publication No. 2000-133215

SUMMARY

Technical Problem

Therefore, it is desirable to provide a small battery equipped with a winding electrode, a sheath material, and an assembled battery equipped with the same.

Solution to Problem

According to a first embodiment of the present technology, there is provided a battery including a substantially cylindrically shaped winding electrode having a hollow portion in the center, and a sheath material having flexibility which sheathes the winding electrode, wherein a width of the hollow portion is 2.5 mm or less.

According to a second embodiment of the present technology, there is provided an assembled battery including a plurality of batteries electrically connected in at least one of parallel and series, wherein the batteries are equipped with a substantially cylindrically shaped winding electrode having a hollow portion in the center and a sheath material having flexibility which sheathes the winding electrode, and a width of the hollow portion is 2.5 mm or less.

According to a third embodiment of the present technology, there is provided a method of manufacturing a winding electrode for a battery, the method including inserting a separator into a gap of a winding core, winding the winding core to wind two portions of the separator around an outer peripheral surface of the winding core, wherein at least one electrode is stacked on the separator, and removing the winding core to leave a hollow portion in a central portion of the winding electrode. The winding electrode is substantially cylindrically shaped. The hollow portion is substantially cylindrically shaped with a diameter of 2.5 mm or less that extends along a central axis of the winding electrode.

Advantageous Effects of Invention

As described above, according to the embodiments of the present technology, it is possible to miniaturize the battery equipped with the winding electrode and the sheath material.

DESCRIPTION OF EMBODIMENTS

Figure 1A:
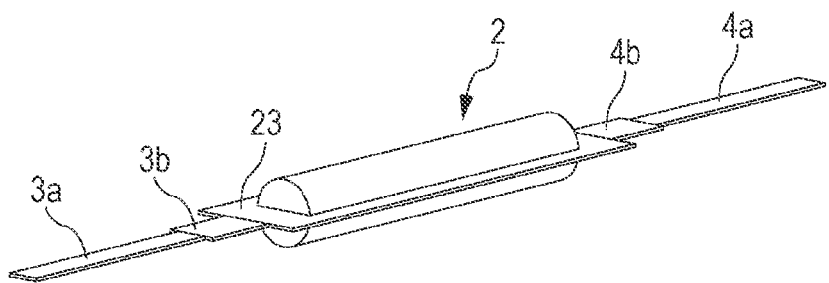
FIG. 1A is a perspective view showing an example of an appearance of a battery according to a first embodiment of the present technology.
Figure 1B:
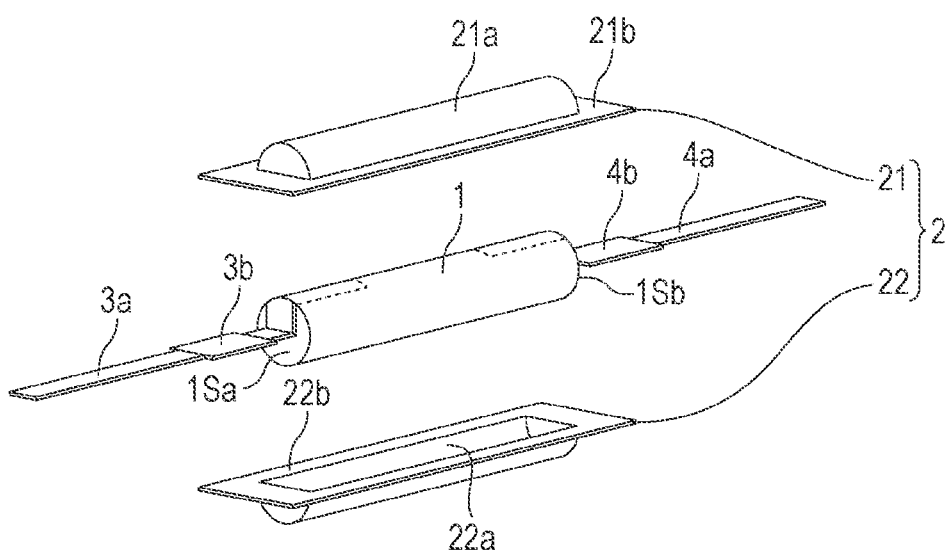
FIG. 1B is an exploded perspective view showing an example of a configuration of the battery according to the first embodiment of the present technology.

The embodiments of the present technology will be described in the following order.
 1. First Embodiment (example of battery)
  1.1 Configuration of Battery
  1.2 Manufacturing Method of Battery
  1.3 Effect
  1.4 Modification Example
 2. Second Embodiment (example of assembled battery)
  2.1 Configuration of Electronic Device
  2.2 Modification Example
First Embodiment
 (1.1 Configuration of Battery)
 FIG. 1A shows an example of an appearance of a battery according to a first embodiment of the present technology. FIG. 1B shows an example of a configuration of the battery according to the first embodiment of the present technology. The battery is a so-called lithium ion secondary battery, and is equipped with a substantially cylindrical shape winding electrode 1 having a hollow portion in the center, a sheath material 2 having flexibility which sheathes the winding electrode 1, and a positive electrode lead 3a and a negative electrode lead 4a which are electrically connected to the outer peripheral portion of the winding electrode 1. The sheath material 2 has a substantially cylindrical shape space portion, and the winding electrode 1 is housed in the space portion. Then, a joining such as a heat fusion portion is provided so as to surround the four sides of the winding electrode 1 that is housed in the space portion.

Hereinafter, the positive electrode lead 3a and the negative electrode lead 4a, the sheath material 2, and the winding electrode 1 configuring the battery will be sequentially described.

Positive Electrode Lead and Negative Electrode Lead

The end portion of one side of the positive electrode lead 3a is electrically connected to the outer periphery of the end portion of one side of the winding electrode 1, and the other end of the positive electrode lead 3a is led out to the outside of the sheath material 2 from the end portion of one side of the winding electrode 1. The sheath material 2 is joined by sandwiching the positive electrode lead 3a at the end portion side of one side of the winding electrode 1. Meanwhile, one end of the negative electrode lead 4a is electrically connected to the outer periphery of the end portion of the other side of the winding electrode 1, and the other end of the negative electrode lead 4a is led out to the outside of the sheath material 2 from the end portion of the other side of the winding electrode 1. The sheath material 2 is joined by sandwiching the negative electrode lead 4a at the end portion side of the other side of the winding electrode 1.

Figure 2A:
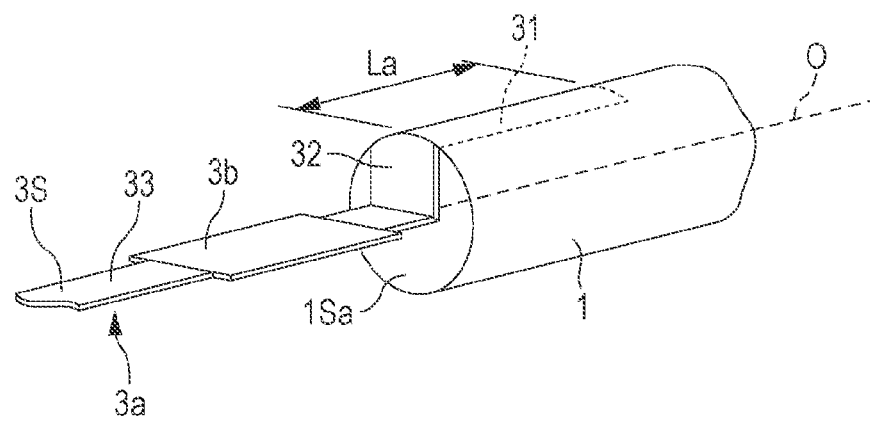
FIG. 2A is a perspective view showing an example of a shape of a positive electrode lead provided at an end portion of one side of a winding electrode.

FIG. 2A shows an example of a shape of a positive electrode lead 3a provided at the end portion of one side of the winding electrode 1. The positive electrode lead 3a is bent substantially perpendicularly to an end surface 1Sa at the center of the end surface 1Sa of one side of the winding electrode 1, and is led out to the outside of the sheath material 2. The positive electrode lead 3a has a connecting portion 31 which is electrically connected to the outermost peripheral portion of the positive electrode included in the winding electrode 1, a bent portion 32 which is bent so as to follow the end surface 1Sa of one side of the winding electrode 1, and a led-out portion 33 which is led out in the direction substantially perpendicular to the end surface 1Sa. At the portion that is sandwiched between the sheath material 2 of the led-out portion 33, a sealant material 3b such as a heat fusion sealing material is provided. Thus, it is possible to improve adhesiveness between the positive electrode lead 3a led out from the sheath material 2 and the inner side surface of the sheath material 2.

Figure 2B:
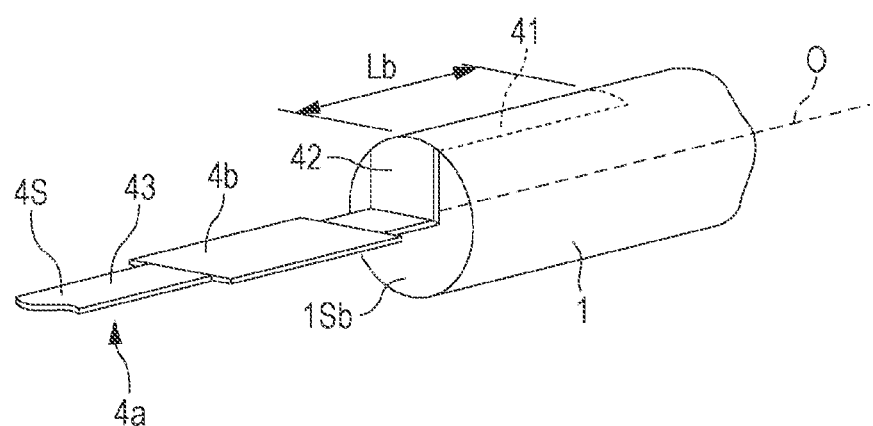
FIG. 2B is a perspective view showing an example of a shape of a negative electrode lead provided at an end portion of the other side of the winding electrode.

FIG. 2B shows an example of a shape of the negative electrode lead 4a provided at the end portion of the other side of the winding electrode 1. The negative electrode lead 4a is bent substantially perpendicularly to an end surface 1Sb at the center of the end surface 1Sb of the other side of the winding electrode 1, and is led out to the outside of the sheath material 2. The negative electrode lead 4a has a connecting portion 41 which is electrically connected to the outermost peripheral portion of the negative electrode included in the winding electrode 1, a bent portion 42 which is bent so as to follow the end surface 1Sb of one side of the winding electrode 1, and a led-out portion 43 which is led out in the direction substantially perpendicular to the end surface 1Sb. At the portion that is sandwiched between the sheath material 2 of the led-out portion 43, a sealant material 4b such as a heat fusion sealing material is provided. Thus, it is possible to improve adhesiveness between the negative electrode lead 4a led out from the sheath material 2 and the inner side surface of the sheath material 2.

The positive electrode lead 3a and the negative electrode lead 4a, for example, are configured with a metal material such as aluminum, copper, nickel, or stainless steel. Each of the sealant materials 3b and 4b is configured with a material having adhesiveness with the positive electrode lead 3a and the negative electrode lead 4a, for examples, a polyolefin resin such as polyethylene, polypropylene, modified polyethylene, or modified polypropylene.

Each of the positive electrode lead 3a and the negative electrode lead 4a has a thin plate shape or a net shape having a principal surface 3S or 4S. The principal surfaces 3S and 4S of the positive electrode lead 3a and the negative electrode lead 4a and the joining portion 23 in a state of being erected substantially perpendicularly to the end surface 1Sa or 1Sb of the winding electrode 1 and the peripheral surface preferably have a substantially parallel relationship. This is because joining of the sheath material 2 at both end sides of the winding electrode 1 becomes easier.

When viewing the winding electrode 1 from the direction perpendicular to the end surface 1Sa or the end surface 1Sb, the connecting portion 31 of the positive electrode lead 3a and the connecting portion 41 of the negative electrode lead 4a, for example, are provided at the position of being overlapped, or are provided at the position facing the peripheral surface of the winding electrode 1. Moreover, in FIG. 1B, an example of the former is shown.

As described above, in a case where the connecting portions 31 and 41 are provided at the position of being overlapped, the connecting portions 31 and 41 are preferably provided so as not to be overlapped on the peripheral surface of the winding electrode 1. More specifically, each of the lengths La and Lb of the connecting portions 31 and 41 of the positive electrode lead 3a and the negative electrode lead 4a is preferably a half or less of the length (height) L of the winding electrode 1 ((La/2) and (Lb/2) are equal to or less than L). This is because it is possible to prevent deformation of the winding electrode 1 due to overlapping of the connecting portions 31 and 41, and it is possible to improve the roundness of the cross-sectional shape of the winding electrode 1. Here, as shown in FIGS. 2A and 2B, the length L of the winding electrode 1 and the lengths La and Lb of the connecting portions of the positive electrode lead 3a and the negative electrode lead 4a mean the lengths in the direction of the central axis O.

Sheath Material

The sheath material 2 is equipped with a first sheath material 21 and a second sheath material 22. For example, the first sheath material 21 and the second sheath material 22 are formed of a rectangular film having flexibility. As the film, a laminated film is preferably used. The first sheath material 21 and the second sheath material 22 have substantially the same shapes. Specifically, the first sheath material 21 has a first space portion 21a of a substantially semicylindrical shape provided on a principal surface of one side, and a peripheral portion 21b provided so as to surround the four sides of the first space portion 21a. On the other hand, the second sheath material 22 has a second space portion 22a of a substantially semicylindrical shape provided on a principal surface of one side, and a peripheral portion 22b provided so as to surround the four sides of the second space portion 22a. Here, the semicylindrical shape refers to a shape in which a circular column is divided into two in the axial direction, so-called a cylindrical shape. Hereinafter, among both principal surfaces of the first sheath material 21 and the second sheath material 22, the principal surface of the side on which the winding electrode 1 is housed, that is, the principal surface of the less than the first space portion 21a and the second space portion 22a are provided, is appropriately referred to as a housing surface.

In the state of superimposing the housing surfaces of the first sheath material 21 and the second sheath material 22 such that both face each other, the peripheral portions 21b and 22b thereof are disposed so as to surround the four sides of the winding electrode 1, and the peripheral portions are joined by the heat fusion portion or the like. Thus, a substantially cylindrical shape space portion is formed between the first sheath material 21 and the second sheath material 22. As described above, the substantially cylindrical shape winding electrode 1 is housed in the space portion. The space portion preferably has substantially the same size as the winding electrode 1. This is because in a state in which the winding electrode 1 is housed in the sheath material 2, it is possible to increase adhesiveness between them.

Figure 3A:
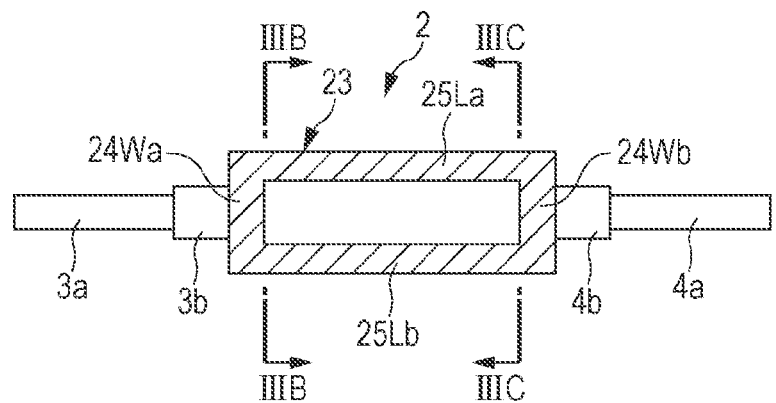
FIG. 3A is a top view showing an example of a shape of the battery according to the first embodiment of the present technology.
Figure 3B:
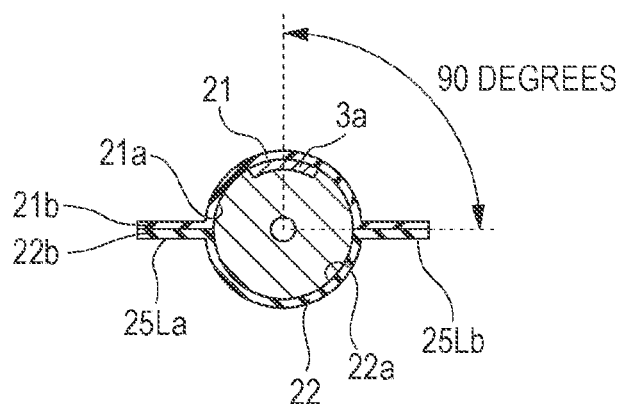
FIG. 3B is a cross-sectional view showing an example of a cross-sectional structure taken along line IIIB-IIIB of FIG. 3A.
Figure 3C:
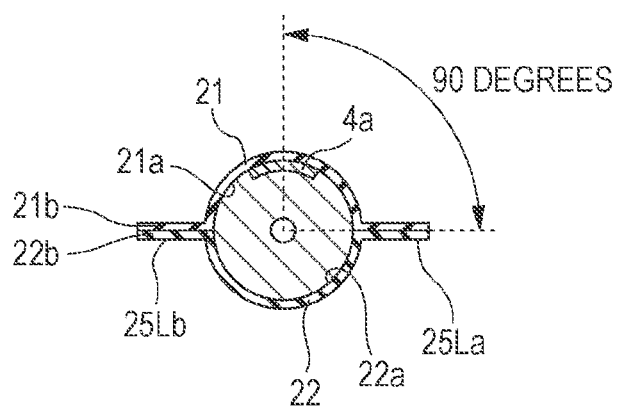
FIG. 3C is a cross-sectional view showing an example of a cross-sectional structure taken along line IIIC-IIIC of FIG. 3A.

FIG. 3A shows an example of a shape of the battery according to the first embodiment of the present technology. FIG. 3B shows an example of a cross-sectional structure taken along line IIIB-IIIB shown in FIG. 3A. FIG. 3C shows an example of a cross-sectional structure taken along line IIIC-IIIC shown in FIG. 3A. The positive electrode lead 3a is provided at the position facing any bottom portion of the first space portion 21a and the second space portion 22a in the outermost peripheral portion of the positive electrode included in the winding electrode 1. On the other hand, the negative electrode lead 4a is provided at the position facing any bottom portion of the first space portion 21a and the second space portion 22a in the outermost peripheral portion of the negative electrode included in the winding electrode 1.

The joining portion 23 provided around the winding electrode 1 is equipped with short side joining portions 24Wa and 24Wb provided at both end sides of the winding electrode 1 and peripheral surface side joining portions 25La and 25Lb provided at the peripheral surface side of the winding electrode 1. The peripheral surface side joining portions 25La and 25Lb are provided at the position facing the central axis of the winding electrode 1. In FIGS. 1A and 1B and FIGS. 3A to 3C, examples in which the short side joining portions 24Wa and 24Wb are erected substantially perpendicularly to the end surface 1Sa or 1Sb, and the peripheral surface side joining portions 25La and 25Lb are erected substantially perpendicular to the peripheral surface are shown. However, the shapes of the short side joining portions 24Wa and 24Wb, and the peripheral surface side joining portions 25La and 25Lb are not limited thereto. For example, the short side joining portions 24Wa and 24Wb and the peripheral surface side joining portions 25La and 25Lb may be modified by being curved or bent. For example, the positive electrode lead 3a and the negative electrode lead 4a are provided at the positions at 90 degrees in the clockwise direction or the counter-clockwise direction based on the positions at which the short side joining portion 24Wa and 24Wb are provided, on the peripheral surface of the winding electrode 1.

Figure 4:
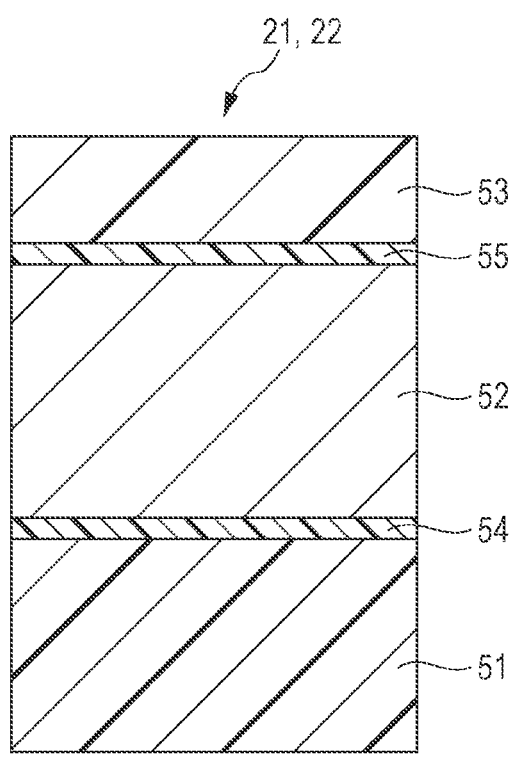
FIG. 4 is a cross-sectional view showing an example of a configuration of a first and a second sheath material.

FIG. 4 is a cross-sectional view showing an example of a configuration of the first sheath material 21 and the second sheath material 22. For example, the first sheath material 21 and the second sheath material 22 are laminated films having moisture resistance and an insulating property, and have laminated structures in which a heat fusion resin layer 51 which is a first resin layer, a metal layer 52, and a surface protective layer 53 which is a second resin layer are laminated in this order. The sheath material 2 may be further equipped with an adhesive layer 54 between the heat fusion resin layer 51 and the metal layer 52, if necessary. In addition, an adhesive layer 55 may be further equipped between the metal layer 52 and the surface protective layer 53. Moreover, the surface of the heat fusion resin layer 51 side becomes a housing surface of the side housing the winding electrode 1.

As the material of the heat fusion resin layer 51, resins which are fusible by heat or ultrasonic waves are preferably used. As such resins, polyolefin-based resins such as polypropylene (PP) and polyethylene (PE) are preferably used, and for example, unstretched polypropylene (CPP) is used. In a case of sealing the periphery of the winding electrode 1 by applying heat to the first sheath material 21 and the second sheath material 22, the material of the heat fusion resin layer 51 is melted, and thus the peripheries of the first sheath material 21 and the second sheath material 22 are joined.

The metal layer 52 is one that plays a role of preventing the entry of moisture, oxygen, and light, and protecting the winding electrode 1 which is content. As the material of the metal layer 52, from the viewpoint of lightness, extensibility, price, and ease of processing, for example, metal foils formed of aluminum (Al) or an aluminum alloy is used.

The surface protective layer 53 is intended for protecting the surfaces of the first sheath material 21 and the second sheath material 22. As the material of the surface protective layer 53, from the viewpoint of aesthetics, toughness, and flexibility, for example, nylon (Ny) or polyethylene terephthalate (PET) is used.

As the material of the adhesive layers 54 and 55, for example, adhesives formed of a urethane resin, an acrylic resin, or a styrene resin can be used.

Moreover, the first sheath material 21 and the second sheath material 22 are not limited to those having the above-described structures. For example, as the first sheath material 21 and the second sheath material 22, laminate films having a structure different from the structures described above, polymer films such as polypropylene, or metal films may be used. In addition, as the first sheath material 21 and the second sheath material 22, from the viewpoint of aesthetics, sheath materials which are further equipped with a colored layer, and/or include a coloring material in at least one kind selected from among the heat fusion resin layer 51, the surface protective layer 53, and the adhesive layers 54 and 55 may be used. More specifically, sheath materials which are further equipped with a colored layer on the surface of the surface protective layer 53, include a colorant in the adhesive layers 54 between the metal layer 52 and the surface protective layer 53, and include a colorant in the surface protective layer 53 itself may be used.

The thickness of the first sheath material 21 and the second sheath material 22 at the end surface side of the winding electrode 1 may be different from the thickness of the first sheath material 21 and the second sheath material 22 at the peripheral surface side of the winding electrode 1. More specifically, for example, the thickness of the first sheath material 21 and the second sheath material 22 at the end surface side of the winding electrode 1 may be thinner compared to the thickness of the first sheath material 21 and the second sheath material 22 at the peripheral surface side of the winding electrode 1.

In a case where the first sheath material 21 and the second sheath material 22 have laminated structures including metal layers, the thickness of the metal layers at the end surface side of the winding electrode 1 may be different from the thickness of the metal layers at the peripheral surface side of the winding electrode 1. More specifically, for example, the thickness of the metal layers at the end surface side of the winding electrode 1 may be thinner compared to the thickness of the metal layers at the end surface side of the winding electrode 1.

The thickness of the first sheath material 21 and the second sheath material 22 at the end surface side of the winding electrode 1 and metal layers included therein can be measured, for example, in the following manner. First, by an FIB (Focused Ion Beam) processing, a cross-section of the first sheath material 21 and the second sheath material 22 is cut out, in the direction perpendicular to the fusion surface of the first sheath material 21 and the second sheath material 22, so as to include the central axis of the winding electrode 1. Next, the cross-section is observed using TEM (Transmission Electron Microscope), and the thickness of the first sheath material 21 and the second sheath material 22 on the end surface side of the winding electrode 1 and metal layers included therein is determined.

The thickness of the first sheath material 21 and the second sheath material 22 on the peripheral surface side of the winding electrode 1 and metal layers included therein can be measured, for example, in the following manner. First, by the FIB processing, a cross-section of the first sheath material 21 and the second sheath material 22 is cut out in the direction perpendicular to the central axis of the winding electrode 1, so as to include the central axis of the winding electrode 1. Next, the cross-section is observed using TEM, and the thickness of the first sheath material 21 and the second sheath material 22 at the peripheral surface side of the winding electrode 1 and metal layers included therein is determined.

Winding Electrode

Figure 5A:
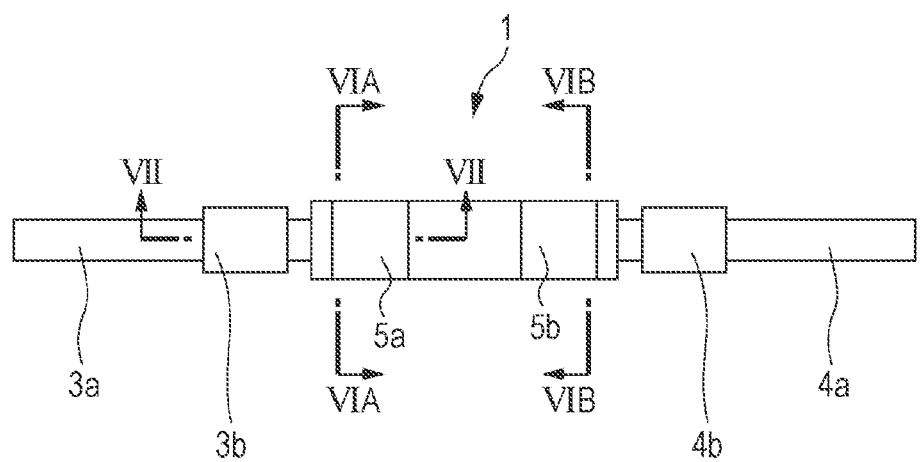
FIG. 5A is top view showing an example of a shape of the winding electrode.

FIG. 5A shows an example of a shape of the winding electrode 1. Winding stop portions 5a and 5b which are intended for stopping winding of the winding electrode 1 are provided on the peripheral surface of the winding electrode 1. The winding stop portions 5a and 5b cover one turn or more of the peripheral surface of the winding electrode 1, and preferably cover at least both end portions of the peripheral surface of the winding electrode 1. This is because it is possible to suppress deformation of the winding electrode 1 due to charging and discharging. As the winding stop portions 5a and 5b, for example, a rectangular tape or the like can be used, however, there is no limitation thereto. In FIG. 5A, an example in which both ends of the peripheral surface of the winding electrode 1 are winding-stopped by the two winding stop portions 5a and 5b is shown, however, the number of the winding stop portions and the arrangement positions of the winding stop portions are not limited thereto. For example, the number of the winding stop portions may be one, or three or greater. In addition, the arrangement positions of the winding stop portions may be central portions of the peripheral surface of the winding electrode 1. In addition, the winding number of the winding stop portions 5a and 5b wound on the peripheral surface of the winding electrode 1 is not limited to one turn or more, and it is also possible to be less than one turn.

Figure 5B:
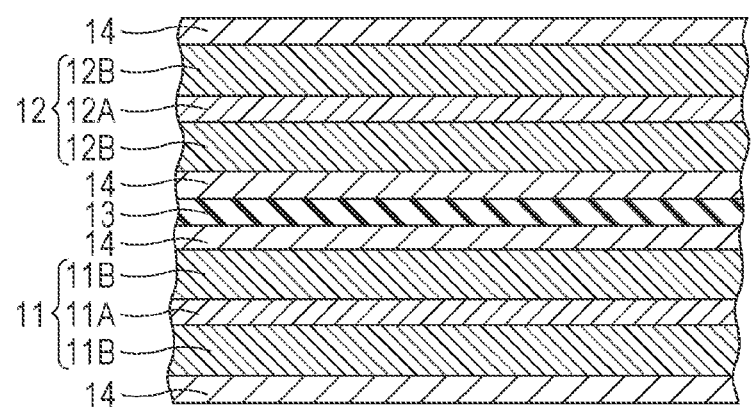
FIG. 5B is a cross-sectional view representing an example of an enlarged cross-sectional structure of the winding electrode shown in FIG. 5A.
Figure 6A:
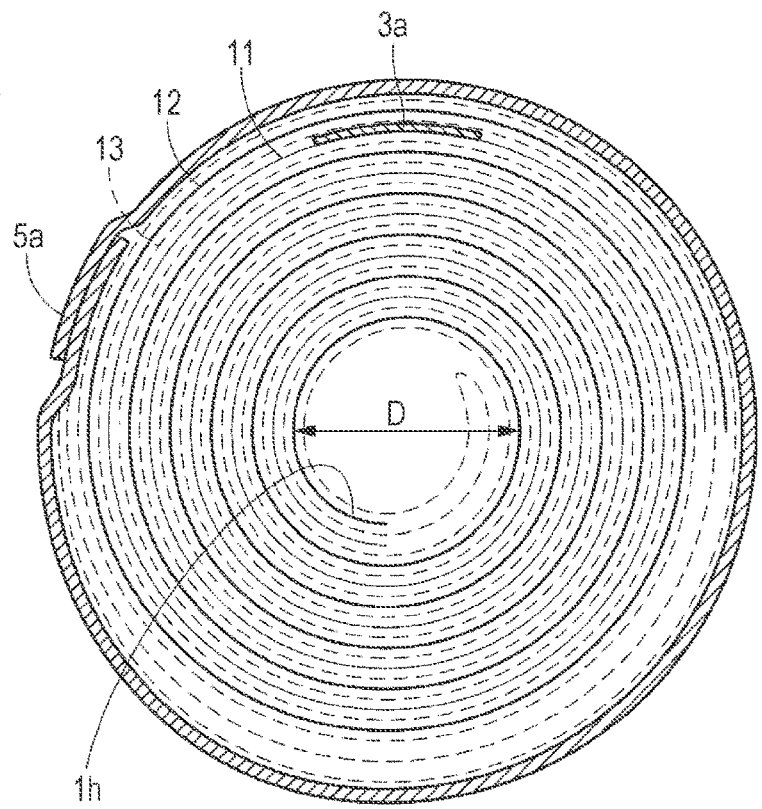
FIG. 6A is a cross-sectional view showing an example of a cross-sectional structure taken along line VIA-VIA of FIG. 5A.
Figure 6B:
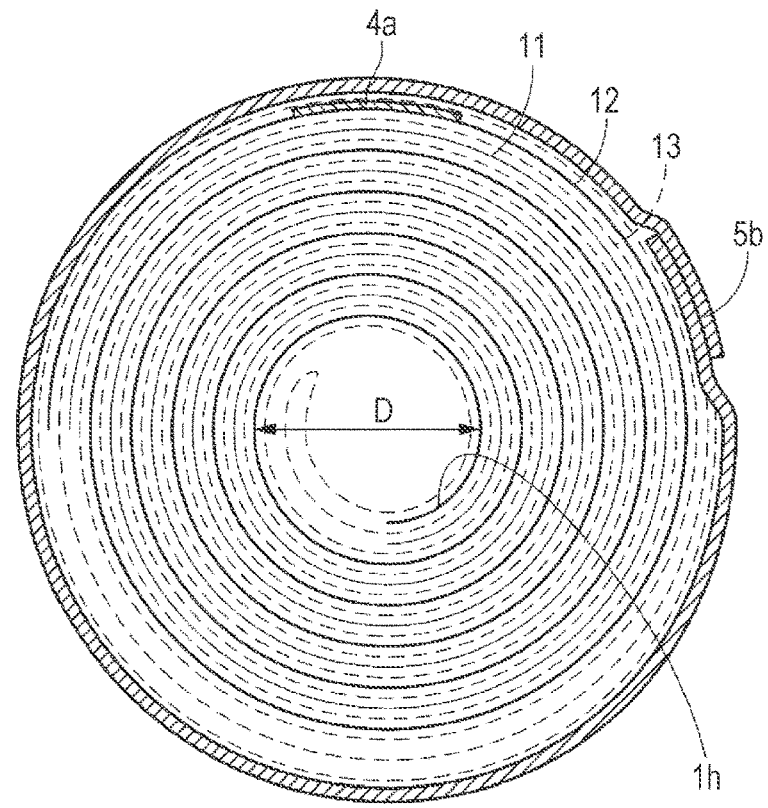
FIG. 6B is a cross-sectional view showing an example of a cross-sectional structure taken along line VIB-VIB of FIG. 5A.

FIG. 5B represents an example of an enlarged cross-sectional structure of the winding electrode 1 shown in FIG. 5A. FIG. 6A shows an example of a cross-sectional structure taken along line VIA-VIA of FIG. 5A. FIG. 6B shows an example of a cross-sectional structure taken along line VIB-VIB of FIG. 5A. The winding electrode 1 is equipped with a positive electrode 11, a negative electrode 12, a separator 13, and an electrolyte layer 14, and the positive electrode 11, the negative electrode 12, and the separator 13 have, for example, an elongated rectangular shape. The winding electrode 1 has a winding structure in which the positive electrode 11 and the negative electrode 12 through the separator 13 are wound in a longitudinal direction thereof. For example, the winding electrode 1 is wound such that both the outermost peripheral electrode and the innermost peripheral electrode become the negative electrode 12. Between the positive electrode 11 and the separator 13, and the negative electrode 12 and the separator 13, the electrolyte layer 14 is provided. Moreover, in FIGS. 5A and 5B, in order to facilitate understanding of the winding structure of the positive electrode 11, the negative electrode 12, and the separator 13, the electrolyte layer 14 is not shown.

The separator 13 is folded on the inner peripheral side of the winding electrode 1 so as to sandwich the negative electrode 12. Both ends in the longitudinal direction of the separator 13 cover the outer periphery of the winding electrode 1, and are positioned at the outermost periphery of the winding electrode 1. More specifically, both ends in the longitudinal direction of the separator 13 cover the outermost periphery of the positive electrode 11 and the negative electrode 12, in the outer periphery of the winding electrode 1 such that the positive electrode 11 and the negative electrode 12 are not exposed. For example, the separator 13 is wound one turn or longer than the end portions of the positive electrode 11 and the negative electrode 12. The positive electrode lead 3a and the negative electrode lead 4a are provided at the outermost periphery of each of the positive electrode 11 and the negative electrode 12. The positive electrode 11 is disposed on the outside of the separator 13 folded at the inner peripheral side.

The winding electrode 1 has a substantially cylindrical shape, and a hollow portion 1h in the center thereof. The width D of the hollow portion 1h is the width of a hollow portion formed on the inner side surface of the innermost peripheral electrode which is positioned at the hollow portion 1h. For example, the width D of the hollow portion 1h is 2.5 mm or less, preferably 2 mm or less, and more preferably 1.5 mm or less. Here, the width D of the hollow portion 1h means a width D of the hollow portion 1h in the direction perpendicular to the central axis of the cylindrical shape winding electrode 1. In a case where the width D of the hollow portion 1h varies depending on the direction, a width having a maximum value among widths of the hollow portion 1h is defined as the width D of the hollow portion 1h. For example, the hollow portion 1h is substantially cylindrical shape space. In a case where the hollow portion 1h is a substantially cylindrical shape, the width D of the hollow portion 1h is the diameter thereof.

Figure 7:
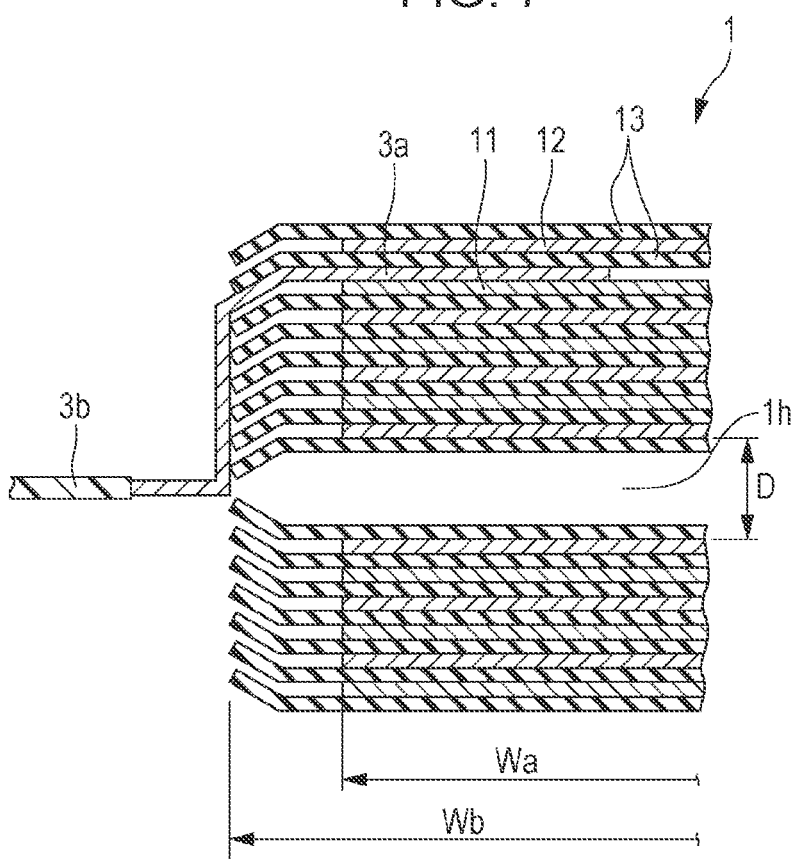
FIG. 7 is a cross-sectional view showing an example of a cross-sectional structure taken along line VII-VII of FIG. 5A.

FIG. 7 shows an example of a cross-sectional structure taken along line VII-VII of FIG. 5A. The width Wb in the short direction of the separator 13 is narrower than the width Wa in the short direction of the positive electrode 11 and the negative electrode 12, and both ends in the short direction of the separator 13 are preferably positioned closer to the outside than both ends in the short direction of the positive electrode 11 and the negative electrode 12. In a case of employing such a configuration, both ends in the short direction of the separator 13 are preferably bent in the direction of the central axis of the winding electrode 1. This is because it is possible to improve safety by covering both ends in the short direction of the positive electrode 11 and the negative electrode 12 by the separator 13. In addition, in a case of employing the above-described configuration, at both ends in the short direction of the separator 13, the end portions of the separator 13 adjacent to the radial direction of the winding electrode 1 may be joined to each other by fusion or the like. In this case, the joined portion may be bent in the direction of the central axis of the winding electrode 1.

Figure 8A:
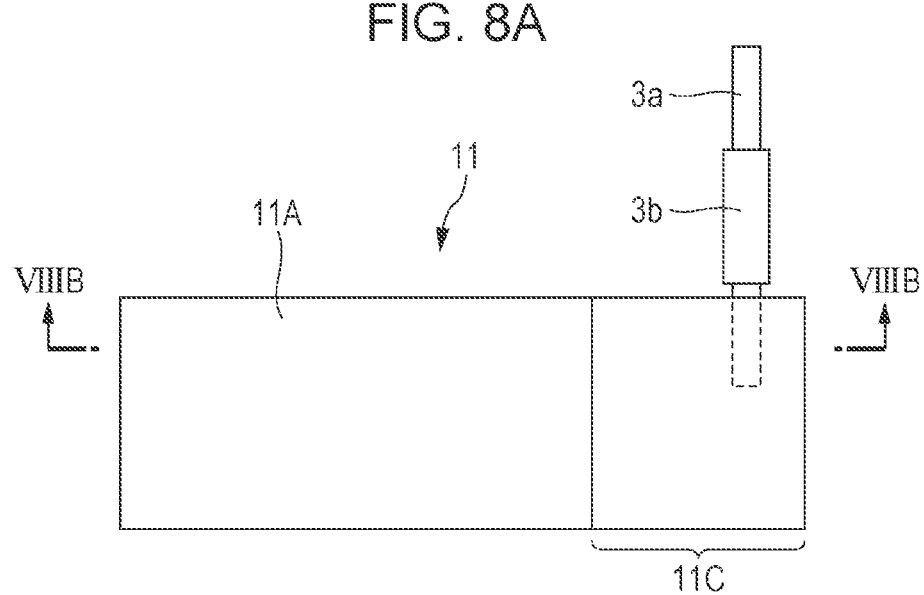
FIG. 8A is a plan view showing an example of a configuration of the positive electrode in an unwound state.
Figure 8B:
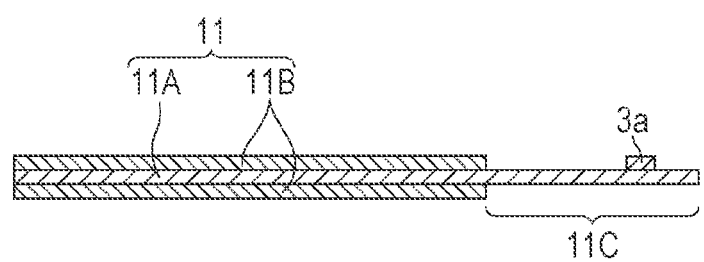
FIG. 8B is a cross-sectional view showing an example of a cross-sectional structure taken along line VIIIB-VIIIB of FIG. 8A.

FIG. 8A shows an example of a configuration of the positive electrode 11 in an unwound state. FIG. 8B shows an example of a cross-sectional structure taken along line VIIIB-VIIIB shown in FIG. 8A. For example, the positive electrode 11 is equipped with a positive electrode current collector 11A and a positive electrode active material layer 11B provided on both surfaces of the positive electrode current collector 11A. Moreover, although not shown, the positive electrode active material layer 11B may be provided on only one surface of the positive electrode current collector 11A.

One end in the longitudinal direction of the positive electrode 11 becomes the inner peripheral side of the winding electrode 1, and the other end in the longitudinal direction of the positive electrode 11 becomes the outer peripheral side of the winding electrode 1. A positive electrode current collector-exposed portion 11C is provided at the other end of the positive electrode 11 which becomes the outer peripheral side, and the positive electrode current collector-exposed portion 11C is not provided at one end of the positive electrode 11 which becomes the inner peripheral side, but the positive electrode active material layer 11B is provided to the tip. For example, the positive electrode current collector-exposed portion 11C is provided on both surfaces of the other end of the positive electrode 11. The positive electrode lead 3a is provided at the exposed portion of a surface which becomes the outer peripheral side in the positive electrode current collector-exposed portion 11C provided at both surfaces thereof. The sealant material 3b is preferably provided away from the long side of the positive electrode 11 so as not to overlap with the positive electrode current collector-exposed portion 11C.

Figure 9A:
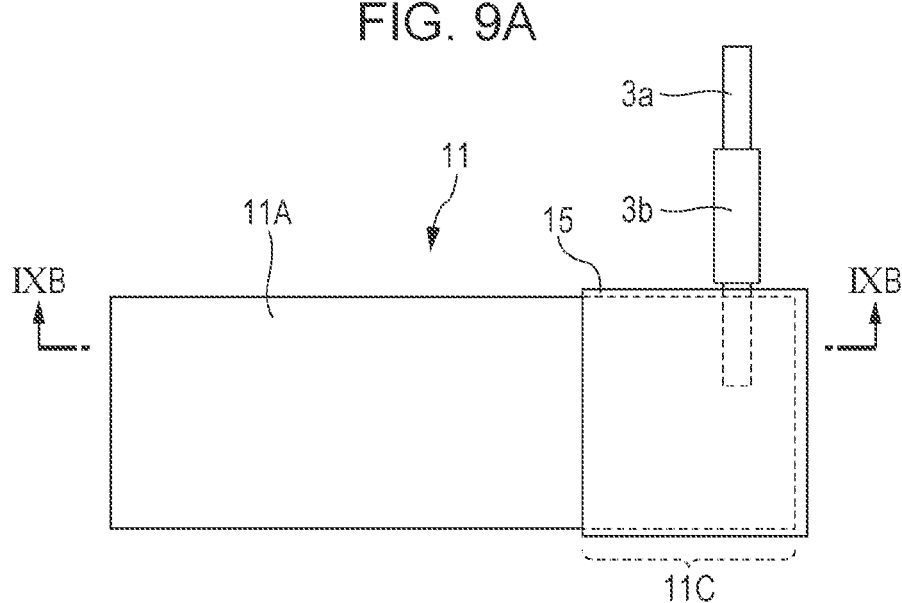
FIG. 9A is a plan view showing an example of a configuration of the positive electrode on which a protective layer is provided.
Figure 9B:
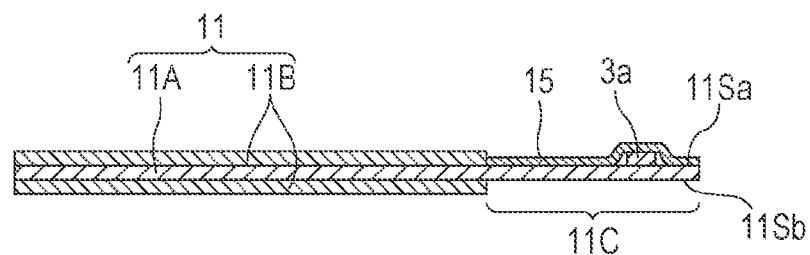
FIG. 9B is a cross-sectional view showing an example of a cross-sectional structure taken along line IXB-IXB of FIG. 9A.
Figure 9C:
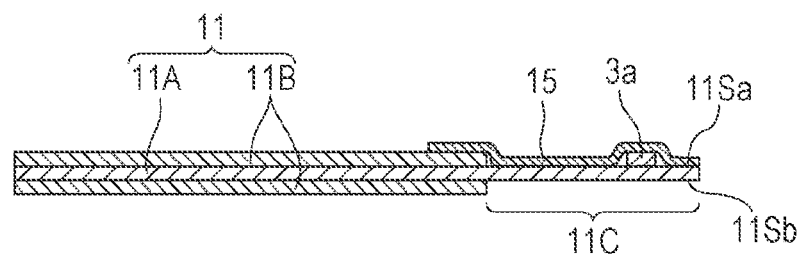
FIG. 9C is a cross-sectional view showing another example of a configuration of the positive electrode on which the protective layer is provided.

As shown in FIGS. 9A and 9B, the protective layer 15 which covers the positive electrode current collector-exposed portion 11C to which the positive electrode lead 3a is electrically connected is preferably further provided. In addition, as shown in FIG. 9C, the end portion of the positive electrode active material layer 11B is preferably covered with the protective layer 15. As the protective layer 15, for example, a protective tape or the like can be used.

Figure 10A:
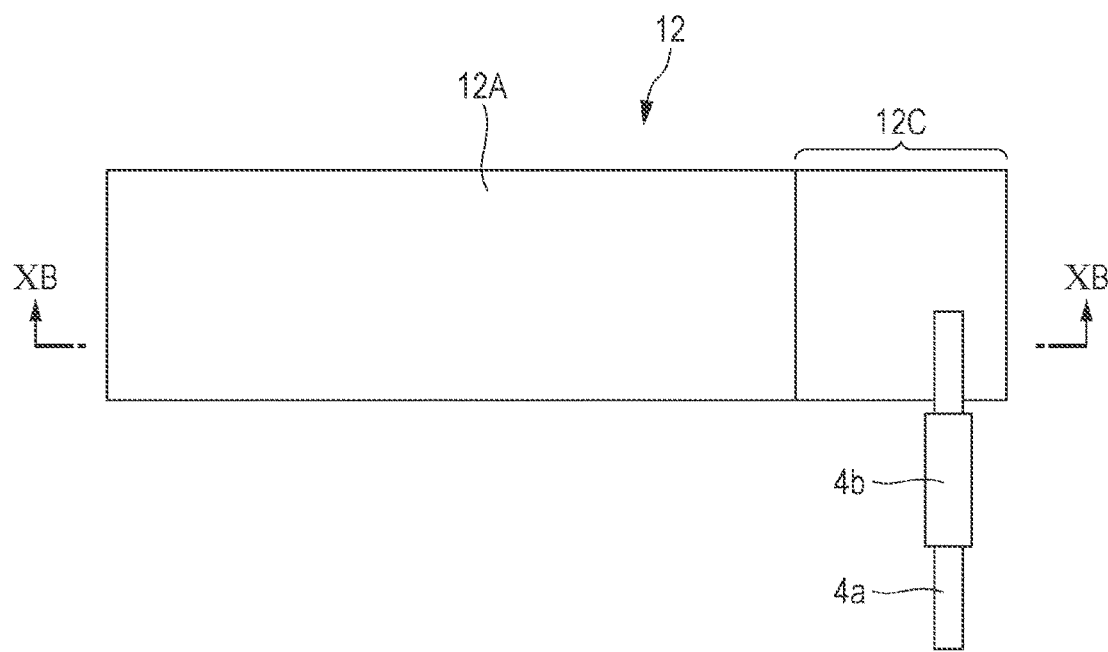
FIG. 10A is a plan view showing an example of a configuration of the negative electrode in the unwound state.
Figure 10B:
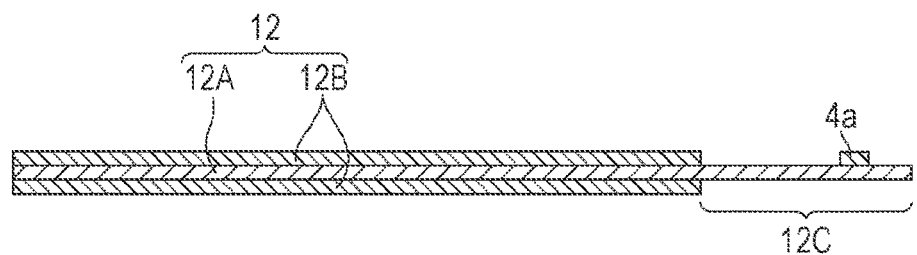
FIG. 10B is a cross-sectional view showing an example of a cross-sectional structure taken along line XB-XB of FIG. 10A.

FIG. 10A shows an example of a configuration of the negative electrode 12 in the unwound state. FIG. 10B shows an example of a cross-sectional structure taken along line XB-XB shown in FIG. 10A. For example, the negative electrode 12 is equipped with a negative electrode current collector 12A and the negative electrode active material layer 12B provided on both surfaces of a negative electrode current collector 12A. Moreover, although not shown, the negative electrode active material layer 12B may be provided on only one surface of the negative electrode current collector 12A.

One end in the longitudinal direction of the negative electrode 12 becomes the inner peripheral side of the winding electrode 1, and the other end in the longitudinal direction of the negative electrode 12 becomes the outer peripheral side of the winding electrode 1. A negative electrode current collector-exposed portion 12C is provided at the other end of the negative electrode 12 which becomes the outer peripheral side, and the negative electrode current collector-exposed portion 12C is not provided at one end of the negative electrode 12 which becomes the inner peripheral side, but the negative electrode active material layer 12B is provided to the tip. For example, the negative electrode current collector-exposed portion 12C is provided on both surfaces of the other end of the negative electrode 12. The negative electrode lead 4a is provided at the exposed portion of a surface which becomes the outer peripheral side in the negative electrode current collector-exposed portion 12C provided at both surfaces thereof. The protective layer is preferably further provided also in the negative electrode current collector-exposed portion 12C in the same manner as in the positive electrode current collector-exposed portion 11C. The sealant material 4b is preferably provided away from the long side of the negative electrode 12 so as not to overlap with the negative electrode current collector-exposed portion 12C.

As described above, it is possible to reduce the size of the winding electrode 1 by providing the positive electrode lead 3a and the negative electrode lead 4a at the outermost periphery of each of the positive electrode 11 and the negative electrode 12. In addition, it is possible to further reduce the size of the winding electrode 1 by providing each of the positive electrode current collector-exposed portion 11C and the negative electrode current collector-exposed portion 12C at only the end portion of the outermost periphery side of the positive electrode 11 or negative electrode 12.

The tip positions of the positive electrode active material layer 11B and the negative electrode active material layer 12B in the longitudinal direction of the winding electrode 1 may correspond to the radial direction of the winding electrode 1. In addition, the tip positions of the positive electrode active material layer 11B and the negative electrode active material layer 12B in the short direction of the positive electrode 11 and the negative electrode 12 may correspond to the radial direction of the winding electrode 1.

The positive electrode 11 and the negative electrode 12 are preferably thin electrodes. Thus, even when the edge positions of the positive electrode active material layer 11B and the negative electrode active material layer 12B are lined up in the radial direction of the winding electrode 1, it is possible to obtain the excellent safety. The thickness of the positive electrode 11 is preferably 150 micrometers or less, more preferably 120 micrometers or less, and even more preferably 60 micrometers or greater and 110 micrometers or less. The thickness of the negative electrode 12 is preferably 150 micrometers or less, more preferably 120 micrometers or less, and even more preferably 60 micrometers or greater and 110 micrometers or less.

For example, the positive electrode current collector 11A is configured with a metal foil such as aluminum foil, nickel foil, or stainless steel foil. For example, the positive electrode active material layer 11B includes one kind or two or more kinds of the positive electrode material capable of occluding and releasing lithium as the positive electrode active material, and is configured to include a conductive agent such as graphite and a binder such as polyvinylidene fluoride, if necessary.

As the positive electrode material capable of occluding and releasing lithium, for example, lithium-containing compounds such as lithium oxide, lithium phosphorus oxide, lithium sulfide, or an intercalation compound including lithium are appropriate, and two or more kinds thereof may be used in combination. In order to increase the energy density, lithium-containing compounds including lithium, a transition metal element, and oxygen (O) are preferable. Examples of such a lithium-containing compound include a lithium composite oxide having a layered rock-salt type structure shown in the formula (A) and a lithium composite oxide having an olivine type structure shown in the formula (B). The lithium-containing compound more preferably includes at least one kind of the group formed of cobalt (Co), nickel (Ni), manganese (Mn), and iron (Fe) as a transition metal element. Examples of such a lithium-containing compound include a lithium composite oxide having a layered rock-salt type structure shown in the formula (C), (D), or (E), a lithium composite oxide having a spinel type structure shown in the formula (F), or a lithium composite oxide having an olivine type structure shown in the formula (G), and specific examples thereof include LiNi$_{0.50}$Co$_{0.20}$Mn$_{0.30}$O$_2$, Li$_a$CoO$_2$ (a is approximately equal to 1), Li$_b$NiO$_2$ (b is approximately equal to 1), Li$_{c1}$Ni$_{c2}$Co$_{1-c2}$O$_2$ (c1 is approximately equal to 1, c2 is greater than 0 and less than 1), Li$_d$Mn$_2$O$_4$ (d is approximately equal to 1), or Li$_e$FePO$_4$ (e is approximately equal to 1).

$$Li_pNi_{(1-q-r)}Mn_qM1_rO_{(2-y)}X_z \qquad (A)$$

(In the formula (A), M1 represents at least one kind among elements selected from Group 2 to Group 15 excluding nickel (Ni) and manganese (Mn). X represents at least one kind among elements of Groups 16 and 17 excluding oxygen (O). p, q, y, and z are values in the range in which p is equal to or greater than 0 and equal to or less than 1.5, q is equal to or greater than 0 and equal to or less than 1.0, r is equal to or greater than 0 and equal to or less than 1.0, y is equal to or greater than −0.10 and equal to or less than 0.20, and z is equal to or greater than 0 and equal to or less than 0.2.)

$$Li_aM2_bPO_4 \quad (B)$$

(In the formula (B), M2 represents at least one kind among elements selected from Group 2 to Group 15. a and b are values in the range in which a is equal to or greater than 0 and equal to or less than 2.0 and b is equal to or greater than 0.5 and equal to or less than 2.0.)

$$Li_fMn_{(1-g-h)}Ni_gM3_hO_{(2-j)}F_k \quad (C)$$

(In the formula (C), M3 represents at least one kind among the group formed of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). f, g, h, j, and k are values in the range in which f is equal to or greater than 0.8 and equal to or less than 1.2, g is equal to or greater than 0 and equal to or less than 0.5, h is equal to or greater than 0 and equal to or less than 0.5, g+h is less than 1, j is equal to or greater than −0.1 and equal to or less than 0.2, and k is equal to or greater than 0 and equal to or less than 0.1. Moreover, the composition of lithium varies depending upon the state of charge and discharge, and the value of f represents a value in a completely discharged state.)

$$Li_mNi_{(1-n)}M4_nO_{(2-p)}F_q \quad (D)$$

(In the formula (D), M4 represents at least one kind among the group formed of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). m, n, p, and q are values in the range in which m is equal to or greater than 0.8 and equal to or less than 1.2, n is equal to or greater than 0.005 and equal to or less than 0.5, p is equal to or greater than −0.1 and equal to or less than 0.2, and q is equal to or greater than 0 and equal to or less than 0.1. Moreover, the composition of lithium varies depending upon the state of charge and discharge, and the value of m represents a value in a completely discharged state.)

$$Li_rCo_{(1-s)}M5_sO_{(2-t)}F_u \quad (E)$$

(In the formula (E), M5 represents at least one kind among the group formed of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). r, s, t, and u are values in the range in which r is equal to or greater than 0.8 and equal to or less than 1.2, s is equal to or greater than 0 and equal to or less than 0.5, t is equal to or greater than −0.1 and equal to or less than 0.2, and u is equal to or greater than 0 and equal to or less than 0.1. Moreover, the composition of lithium varies depending upon the state of charge and discharge, and the value of r represents a value in a completely discharged state.)

$$Li_vMn_{2-w}M6_wO_xF_y \quad (F)$$

(In the formula (F), M6 represents at least one kind among the group formed of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). v, w, x, and y are values in the range in which v is equal to or greater than 0.9 and equal to or less than 1.1, w is equal to or greater than 0 and equal to or less than 0.6, x is equal to or greater than 3.7 and equal to or less than 4.1, and y is equal to or greater than 0 and equal to or less than 0.1. Moreover, the composition of lithium varies depending upon the state of charge and discharge, and the value of v represents a value in a completely discharged state.)

$$Li_zM7PO_4 \quad (G)$$

(In the formula (G), M7 represents at least one kind among the group formed of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). z is a value in the range in which z is equal to or greater than 0.9 and equal to or less than 1.1. Moreover, the composition of lithium varies depending upon the state of charge and discharge, and the value of z represents a value in a completely discharged state.)

As the positive electrode material capable of occluding and releasing lithium, in addition to these, inorganic compounds such as $MnO_2$, $V_2O_5$, $V_6O_{13}$, NiS, and MoS which do not contain lithium can also be used.

The positive electrode material capable of occluding and releasing lithium may be materials other than those described above. In addition, the positive electrode materials exemplified above may be mixed in any combination of two or more kinds thereof.

For example, the negative electrode current collector 12A is configured with a metal foil such as copper foil, nickel foil, or stainless steel foil. The negative electrode active material layer 12B is configured to include one kind or two or more kinds of the negative electrode material capable of occluding and releasing lithium as the negative electrode active material, and is configured to include the same binder as in the positive electrode active material layer 11B, if necessary.

Moreover, in this battery, the electrochemical equivalent of the negative electrode material capable of occluding and releasing lithium is greater than the electrochemical equivalent of the positive electrode 11, and a lithium metal is not deposited on the negative electrode 12 during charging.

As the negative electrode material capable of occluding and releasing lithium, for example, carbon materials such as hardly graphitizable carbon, easily graphitizable carbon, graphite, pyrolytic carbon, coke, glassy carbon, an organic polymer compound fired material, carbon fiber, or activated carbon can be exemplified. As the graphite, natural graphite which was subjected to a spheroidization processing and substantially spherically shaped artificial graphite are preferably used. As the artificial graphite, artificial graphite obtained by graphitizing meso-carbon microbeads (MCMB) or artificial graphite obtained by graphitizing coke raw material and pulverizing is preferable. As the coke, pitch coke, needle coke, petroleum coke, or the like can be exemplified. The organic polymer compound fired material refers to one obtained by firing polymeric material such as a phenol resin and a furan resin at an appropriate temperature to carbonize, and in part, some are classified as hardly graphitizable carbon, or easily graphitizable carbon. In addition, as the polymer material, polyacetylene or polypyrrole can be exemplified. These carbon materials are preferable since change in the crystal structure that occurs during charging and discharging is very small, it is possible to obtain a high charge and discharge capacity, and it is possible to obtain excellent cycle characteristics. In particular, graphite is preferable since an electrochemical equivalent is large, and thus, it is possible to obtain a high energy density. In addition, the hardly graphitizable carbon is preferable since excellent characteristics can be obtained. In addition, materials of which charge and discharge potential are low, in particular, materials of which the charge and discharge potential are close to those of the lithium metal, are preferable since it is possible to easily realize a high energy density of the battery.

As the negative electrode material capable of occluding and releasing lithium, materials which are capable of occluding and releasing lithium and include at least one kind among metal elements and metalloid elements as a constituent element can also be exemplified. Here, the negative electrode 12 including such a negative electrode material is referred to as an alloy-based negative electrode. This is because if using such a material, it is possible to obtain a high energy density. In particular, if using such a material together with the carbon material, it is possible to obtain a high energy density, and it is possible to obtain excellent cycle characteristics, and therefore, it is more preferable. The negative electrode material may be a simple substance, an alloy, or a compound of a metal element or a metalloid element, and may also have one kind or two or more kinds of phases thereof in at least a part. Moreover, the alloy in the present technology also includes an alloy containing one or more kind of metal elements and one or more kinds of metalloid elements in addition to an alloy formed of two or more kinds of metal elements. In addition, a nonmetallic element may be included. In the structure, a solid solution, eutectic crystal (eutectic mixture), an intermetallic compound, or two or more kinds of these coexist.

Examples of the metal element or the metalloid element configuring the negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These may be crystalline or amorphous.

Among these, as the negative electrode material, materials including a metal element of Group 4B in the short-form periodic table or a metalloid element as a constituent element are preferable, and materials including at least one of silicon (Si) and tin (Sn) as a constituent element are particularly preferable. This is because silicon (Si) and tin (Sn) have great abilities of occluding and releasing lithium (Li), and thus, it is possible to obtain a high energy density.

As the tin (Sn) alloy, tin (Sn) alloys including at least one of the group formed of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a second constituent element other than tin (Sn) can be exemplified. As the silicon (Si) alloy, silicon (Si) alloys including at least one of the group formed of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a second constituent element other than silicon (Si) can be exemplified.

As the compound of tin (Sn) or the compound of silicon (Si), compounds including oxygen (O) or carbon (C) can be exemplified, and in addition to tin (Sn) or silicon (Si), may also include the second constituent element described above.

As the negative electrode material capable of occluding and releasing lithium, furthermore, other metal compounds or polymer materials can be exemplified. As the other metal compounds, oxides such as $MnO_2$, $V_2O_5$, and $V_6O_{13}$, sulfides such as NiS and MoS, or lithium nitrides such as $LiN_3$ can be exemplified, and as the polymer materials, polyacetylene, polyaniline, polypyrrole, or the like can be exemplified.

The separator 13 isolates the positive electrode 11 and the negative electrode 12, and thus prevents a short circuit of current due to contact of both electrodes, and passes lithium ions. For example, the separator 13 is configured with porous films made of a synthetic resin such as polytetrafluoroethylene, polypropylene, or polyethylene, or porous films made of ceramic, and has a structure in which these two or more porous film are laminated. Among these, a porous film made of polyolefin has an excellent short circuit prevention effect, and can improve safety of a battery by a shutdown effect, and therefore, it is preferable. In particular, by using polyethylene, it is possible to obtain the shutdown effect within the temperature range of 100 degrees Celsius or higher and 160 degrees Celsius or lower, and polyethylene also has excellent electrochemical stability, and therefore it is preferable as the material configuring the separator 13. In addition, polypropylene is also preferable, and also, if a resin has chemical stability, it is possible to use the resin by copolymerizing or blending the resin with polyethylene or polypropylene.

The electrolyte layer 14 includes a non-aqueous electrolytic solution and a polymer compound which is a holding member for holding the non-aqueous electrolytic solution, and the polymer compound is swollen by the non-aqueous electrolytic solution. The content ratio of the polymer compound can be appropriately adjusted. In particular, in a case where the electrolyte is a gel-like electrolyte, it is possible to obtain high ion conductivity, and it is possible to prevent the fluid leakage of the battery, and therefore it is preferable.

For example, the non-aqueous electrolytic solution includes a solvent and an electrolyte salt. Examples of the solvent include ordinary temperature molten salts such as 4-fluoro-1,3-dioxolan-2-one, ethylene carbonate, propylene carbonate, butylene carbonate, vinylene carbonate, dimethyl carbonate, diethyl carbonate, ethyl methyl carbonate, gamma-butyrolactone, gamma-valerolactone, 1,2-dimethoxyethane, tetrahydrofuran, 2-methyltetrahydrofuran, 1,3-dioxolane, 4-methyl-1,3-dioxolane, methyl acetate, methyl propionate, ethyl propionate, acetonitrile, glutaronitrile, adiponitrile, methoxyacetonitrile, 3-methoxypropionitrile, N,N-dimethylformamide, N-methylpyrrolidinone, N-methyloxazolidinone, nitromethane, nitroethane, sulfolane, dimethyl sulfoxide, trimethyl phosphate, triethyl phosphate, ethylene sulfite, and bistrifluoromethyl sulfonylimide trimethylhexyl ammonium. Among these, by using in combination at least one of the group formed of 4-fluoro-1,3-dioxolan-2-one, ethylene carbonate, propylene carbonate, vinylene carbonate, dimethyl carbonate, ethyl methyl carbonate, and ethylene sulfite, it is possible to obtain excellent charge and discharge capacity characteristics and excellent charge and discharge cycle characteristics, and therefore it is preferable. In order to improve the battery characteristics, the electrolyte layer 14 may contain existing additives.

The electrolyte salt may include a mixture of one or two or more materials. Examples of the electrolyte salt include lithium hexafluorophosphate ($LiPF_6$), lithium bis(pentafluoroethanesulfonyl) imide ($Li(C_2F_5SO_2)2N$), lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), lithium bis(trifluoromethanesulfonyl) imide ($Li(CF_3SO_2)_2N$), lithium tris(trifluoromethanesulfonyl) methide ($LiC(SO_2CF_3)_3$), lithium chloride (LiCl), and lithium bromide (LiBr).

Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, or polycarbonate. In particular, from the viewpoint of electrochemical stability, polyacrylonitrile, polyvinylidene fluoride, polyhexafluoropropylene, or polyethylene oxide is preferable.

(1.2 Manufacturing Method of Battery)

Hereinafter, an example of the manufacturing method of the battery according to the first embodiment of the present technology will be described with reference to FIGS. 8A, 8B, and 10A to 12B.

First, for example, a positive electrode mixture is prepared by mixing a positive electrode active material, a conductive agent, and a binder, and this positive electrode mixture is dispersed in a solvent such as N-methyl-2-pyrrolidone, whereby a paste-like positive electrode mixture slurry is produced. Next, this positive electrode mixture slurry is coated on the positive electrode current collector 11A and dried, and the resultant product is compression-molded using a roll press machine or the like to form the positive electrode active material layer 11B, whereby the positive electrode 11 is formed.

In addition, for example, a negative electrode mixture is prepared by mixing a negative electrode active material and a binder, and this negative electrode mixture is dispersed in a solvent such as N-methyl-2-pyrrolidone, whereby a paste-like negative electrode mixture slurry is produced. Next, this negative electrode mixture slurry is coated on the negative electrode current collector 12A and dried, and the resultant product is compression-molded using a roll press machine or the like to form the negative electrode active material layer 12B, whereby the negative electrode 12 is produced.

Next, a precursor solution including a solvent, an electrolyte salt, a polymer compound, and a mixed solvent is coated on each of the positive electrode 11 and the negative electrode 12, and the mixed solvent is volatilized, whereby the electrolyte layer 14 is formed. Next, as shown in FIGS. 8A and 8B, the positive electrode lead 3a is electrically connected to the positive electrode current collector-exposed portion 11C of the positive electrode 11. Next, as shown in FIGS. 10A and 10B, the negative electrode lead 4a is electrically connected to the negative electrode current collector-exposed portion 12C of the negative electrode 12. As the connection method, ultrasonic welding, resistance welding, and soldering can be exemplified, and in consideration of the damage of the connecting portion by heat, methods in which thermal effects by the ultrasonic welding or the resistance welding are small are preferably used.

Figure 11A:
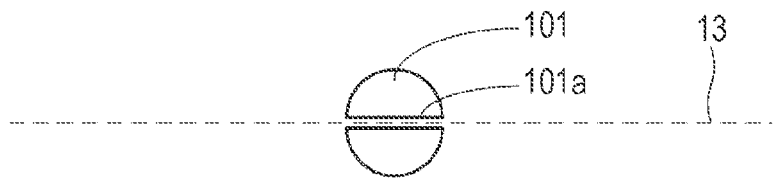
FIG. 11A is a process diagram for illustrating an example of a manufacturing method of the battery according to the first embodiment of the present technology.
Figure 11B:
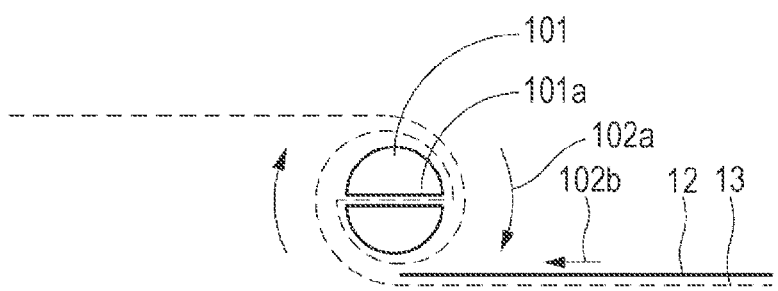
FIG. 11B is a process diagram for illustrating an example of the manufacturing method of the battery according to the first embodiment of the present technology.

Next, as shown in FIG. 11A, a substantially central position in the longitudinal direction of the separator 13 is inserted into a gap 101a of a winding core 101, and is sandwiched by the winding core 101. Next, as shown in FIG. 11B, by rotating the winding core 101 in the direction indicated by an arrow 102a, the separator 13 is wound on the peripheral surface of the winding core 101. Next, the negative electrode 12 is supplied between the separator 13 folded from a substantially middle position from the direction indicated by an arrow 102b. Thus, the negative electrode 12 is dragged between the separator 13 by the rotation of the winding core 101.

Figure 11C:
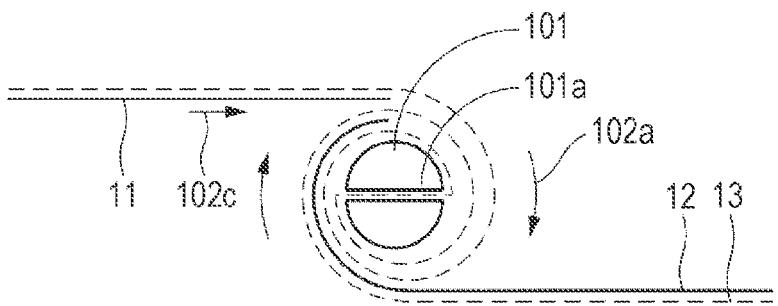
FIG. 11C is a process diagram for illustrating an example of the manufacturing method of the battery according to the first embodiment of the present technology.
Figure 11D:
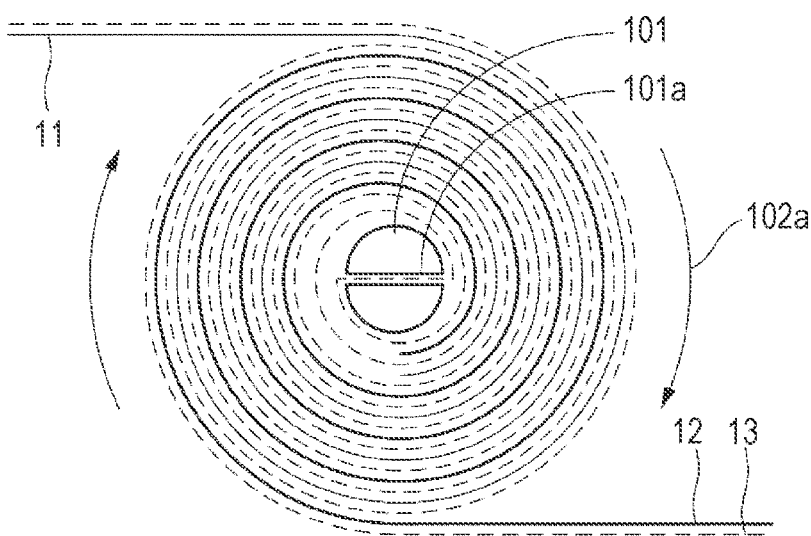
FIG. 11D is a process diagram for illustrating an example of the manufacturing method of the battery according to the first embodiment of the present technology.

Next, as shown in FIG. 11C, the positive electrode 11 is supplied between the separator 13 from the direction indicated by an arrow 102c such that the positive electrode 11 and the negative electrode 12 are overlapped through the separator 13. Thus, the positive electrode 11 is dragged between the separator 13 by the rotation of the winding core 101. At this time, the supplying position of the positive electrode 11 is preferably adjusted such that the tip positions in the longitudinal direction of the positive electrode 11 and the negative electrode 12 are matched. Next, as shown in FIG. 11D, by maintaining the rotation of the winding core 101, the positive electrode 11, the negative electrode 12, and the separator 13 are wound a predetermined number of times. Thus, the winding electrode 1 is obtained.

Figure 12A:
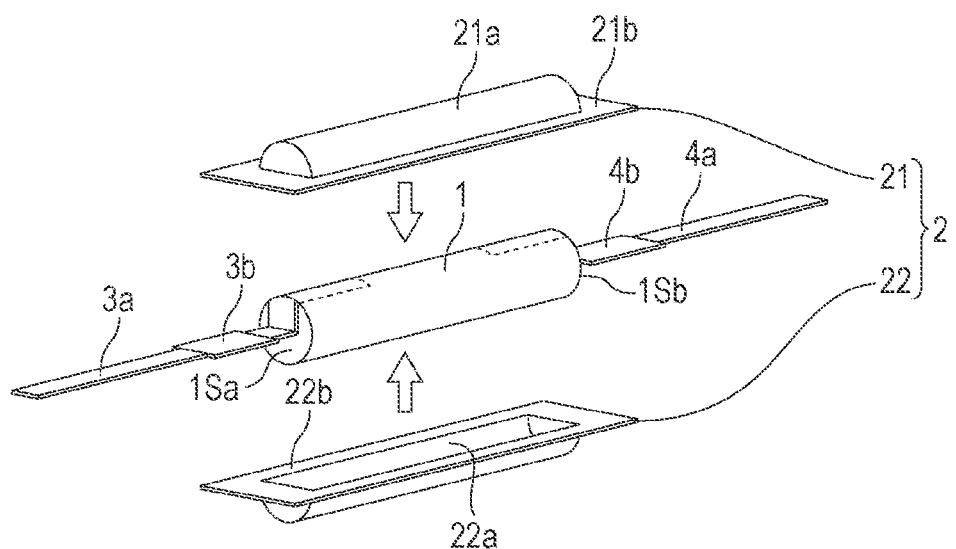
FIG. 12A is a process diagram for illustrating an example of the manufacturing method of the battery according to the first embodiment of the present technology.
Figure 12B:
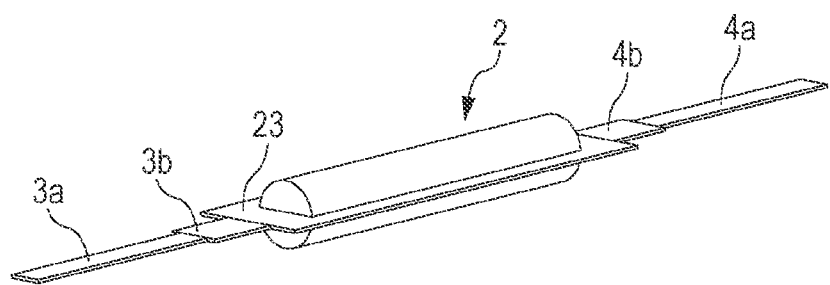
FIG. 12B is a process diagram for illustrating an example of the manufacturing method of the battery according to the first embodiment of the present technology.

Next, as shown in FIG. 12A, the housing surfaces of the first sheath material 21 and the second sheath material 22 are overlapped such that the winding electrode 1 is housed in the first space portion 21a of the first sheath material 21 and the second space portion 22a of the second sheath material 22. Next, as shown in FIG. 12B, the peripheral portions 21b of the first sheath material 21 and the peripheral portions 22b of the second sheath material 22 are joined by heat fusion or the like. Thus, the joining portion 23 is formed around the winding electrode 1, and the winding electrode 1 is sealed by the first sheath material 21 and the second sheath material 22. Thus, the battery of interest can be obtained.

(1.3 Effect)

In the battery according to the first embodiment, since the winding electrode 1 of which the width of the hollow portion 1h is 2 mm or less is housed in the film-like sheath material 2 having flexibility, it is possible to realize a battery having small size and being light in weight. In addition, since the battery has the positive electrode lead 3a and the negative electrode lead 4a, it is possible to easily connect the battery to a circuit of an electronic device or the like. In addition, in a case where attaching each of the positive electrode lead 3a and the negative electrode lead 4a to the outermost periphery of the positive electrode 11 and the negative electrode 12 included in the winding electrode 1, it is possible to further miniaturize the winding electrode 1.

(1.4 Modification Examples)

(Modification Example 1)

Figure 13A:
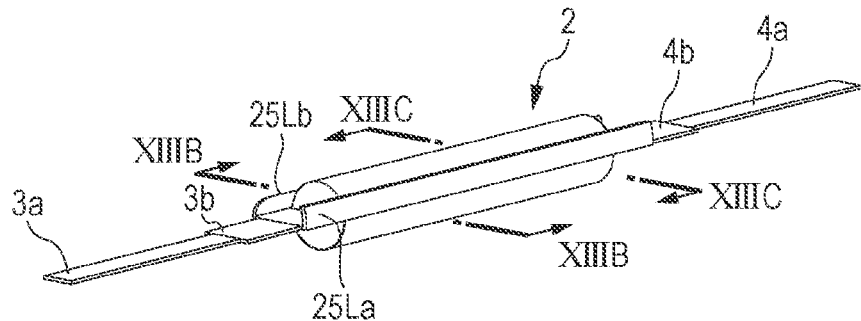
FIG. 13A is a perspective view showing an example of an appearance of a battery according to a first modification example of the first embodiment of the present technology.
Figure 13B:
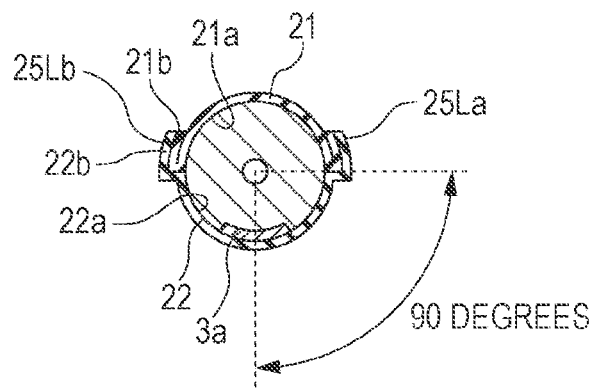
FIG. 13B is a cross-sectional view showing an example of a cross-sectional structure taken along line XIIIB-XIIIB of FIG. 13A.
Figure 13C:
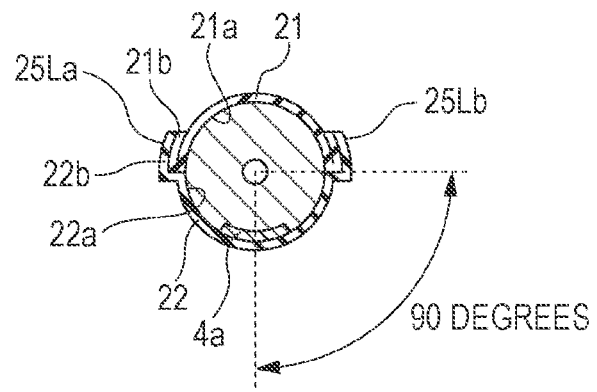
FIG. 13C is a cross-sectional view showing an example of a cross-sectional structure taken along line XIIIC-XIIIC of FIG. 13A.

FIG. 13A shows an example of an appearance of a battery according to a first modification example of the first embodiment of the present technology. FIG. 13B shows an example of a cross-sectional structure taken along line XIIIB-XIIIB of FIG. 13A. FIG. 13C shows an example of a cross-sectional structure taken along line XIIIC-XIIIC of FIG. 13A. The peripheral surface side joining portions 25La and 25Lb provided at the peripheral surface side of the winding electrode 1 may be bent so as to follow the peripheral surface of the winding electrode 1. In this case, the cross-sectional shape of the battery perpendicular to the central axis of the winding electrode 1 is a substantially circular shape. Therefore, it is possible to further miniaturize the battery.

Both of the positive electrode lead 3a and the negative electrode lead 4a are preferably provided on any side of a half peripheral surface which is housed in the first space portion 21a and a half peripheral surface plane which is housed in the second space portion 22a of the peripheral surface of the winding electrode 1. In this case, the peripheral surface side joining portions 25La and 25Lb are preferably provided so as to follow the half peripheral surface of the side opposite to the side on which the positive electrode lead 3a and the negative electrode lead 4a are provided. More specifically, the peripheral surface side joining portions 25La and 25Lb are preferably bent so as to follow the peripheral surface in the direction of the ridge line of the half peripheral surface of the side opposite to the side on which the positive electrode lead 3a and the negative electrode lead 4a are provided. This is because it is possible to improve the roundness of the cross-sectional shape of the battery. Here, the half peripheral surface refers to a surface formed by dividing the peripheral surface of the winding electrode 1 into two in the axial direction thereof.

(Modification Example 2)

Figure 14A:
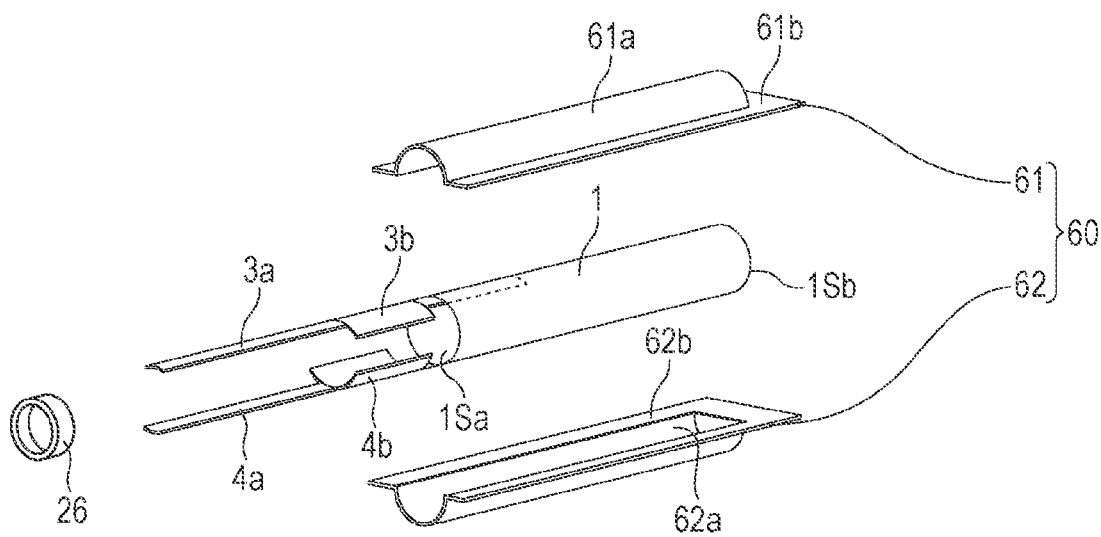
FIG. 14A is an exploded perspective view showing an example of a configuration of a battery according to a second modification example of the first embodiment of the present technology.
Figure 14B:
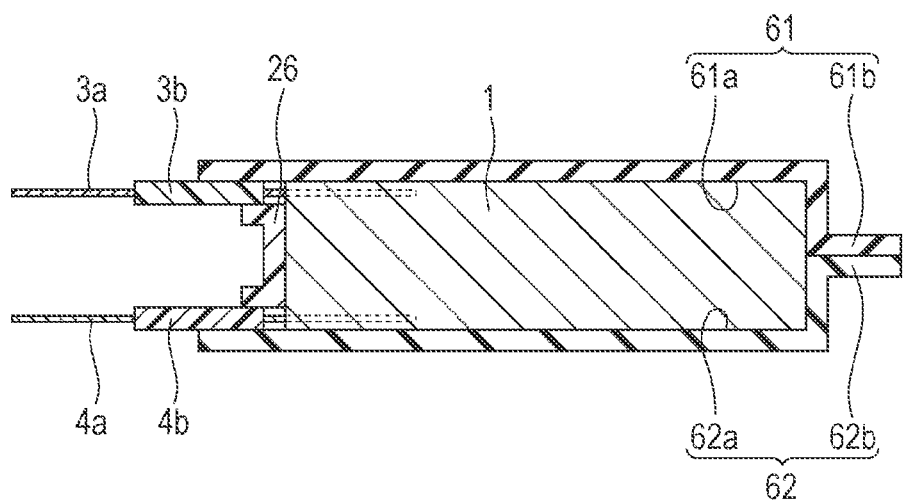
FIG. 14B is a cross-sectional view showing an example of a configuration of the battery according to the second modification example of the first embodiment of the present technology.

FIGS. 14A and 14B show an example of a configuration of a battery according to a second modification example of the first embodiment of the present technology. The battery according to the second modification 2 is different from the battery according to the first embodiment in the point that both of the positive electrode lead 3a and the negative electrode lead 4a are led out to the outside of the sheath material 2 from the end portion of one side of the winding electrode 1. In the modification example 2, the same places as in the first embodiment will be given the same reference numerals, and their descriptions will not be repeated.

The sheath material 60 has a substantially cylindrical shape space portion of which one end is open, and the winding electrode 1 is housed in the space portion. At the open end portion of the space portion, a sheath material 26 is provided as a lid, and by this, the sheath material 60 is sealed. The sheath materials 26 and 60 are joined by sandwiching the positive electrode lead 3a and the negative electrode lead 4a at the end portion side of one side of the winding electrode 1. At the part of the positive electrode lead 3a and the negative electrode lead 4a which is sandwiched by the sheath materials 26 and 60, the sealant materials 3b and 4b are preferably provided. As the sheath materials 26 and 60, the same laminated film as the sheath material 2 in the first embodiment described above can be used. The positive electrode lead 3a and the negative electrode lead 4a are preferably provided at the position not overlapping with the joining portion provided at the peripheral surface side of the winding electrode 1 in the outermost periphery of the winding electrode 1. For example, the positive electrode lead 3a and the negative electrode lead 4a are provided at the positions that are symmetrical about the central axis of the winding electrode 1.

The sheath material 60 is equipped with a first sheath material 61 and a second sheath material 62. The first sheath material 61 has a first space portion 61a provided on the principal surface of one side, and a peripheral portion 61b provided at the periphery of the first space portion 61a. The second sheath material 62 has a second space portion 62a provided on the principal surface of one side, and a peripheral portion 62b provided at the periphery of the second space portion 62a. The first space portion 61a and the second space portion 62a have substantially semicylindrical shapes, and the end portion of one side thereof is open. Each of the peripheral portions 61b and 62b has a letter-U shape, and are provided so as to surround the three sides of the first space portion 61a and the second space portion 62a. The sheath material 26 as a lid has a substantially circular shape, and at the peripheral portion thereof, the joining portion for being joined with the sheath material 60 is provided.

(Modification Example 3)

Figure 15:
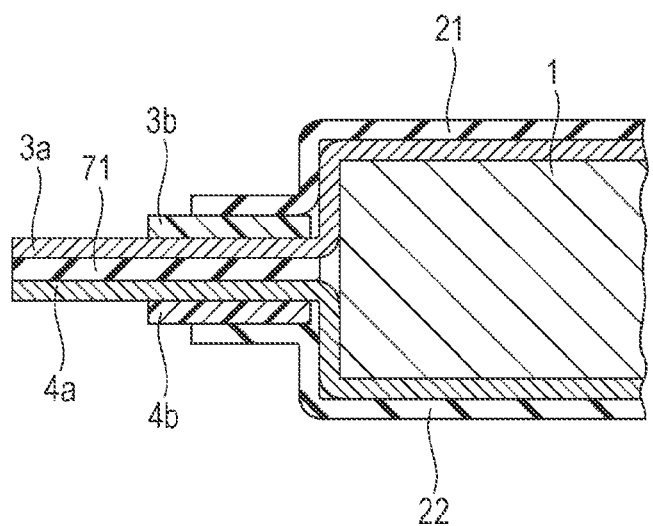
FIG. 15 is a cross-sectional view showing an example of a configuration of a battery according to a third modification example of the first embodiment of the present technology.

FIG. 15 is a cross-sectional view showing an example of a configuration of a battery according to a third modification example of the first embodiment of the present technology. In the first embodiment, the positive electrode lead 3a and the negative electrode lead 4a may be led out to the outside of the sheath material 2 from the end portion of one side of the winding electrode 1. In this case, the first sheath materials 21 and 22 are joined by sandwiching the positive electrode lead 3a and the negative electrode lead 4a at the end portion side of one side of the winding electrode 1. An insulating member 71 is provided between the positive electrode lead 3a and the negative electrode lead 4a led out to prevent electrical contact therebetween. As the insulating member, for example, an adhesive sheet having an insulating property or the like can be used. At the part of the positive electrode lead 3a and the negative electrode lead 4a which is sandwiched by the first sheath material 21 and the second sheath material 22, the sealant materials 3b and 4b are preferably provided.

(Modification Example 4)

An example of the battery according to a fourth modification example of the first embodiment of the present technology will be described with reference to FIGS. 16A to 17B. In the first embodiment described above, an example in which the positive electrode lead 3a and the negative electrode lead 4a are led out to the outside of the sheath material 2 from both ends of the winding electrode 1, that is, the joining portions of the short sides of the sheath material 2, is shown, however, the led-out directions of the positive electrode lead 3a and the negative electrode lead 4a are not limited to this example. For example, as shown in FIGS. 16A and 17A, the positive electrode lead 3a and the negative electrode lead 4a may be led out from the joining portions of the long sides of the sheath material 2.

Figure 16A:
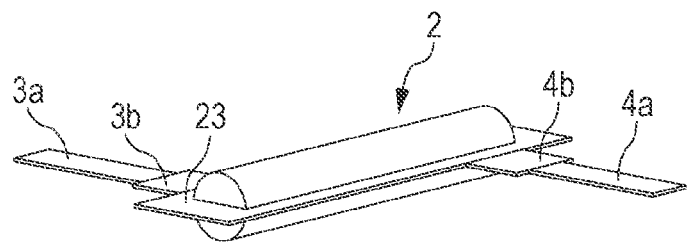
FIG. 16A is a perspective view showing a first example of an appearance of a battery according to a fourth modification example of the first embodiment of the present technology.
Figure 16B:
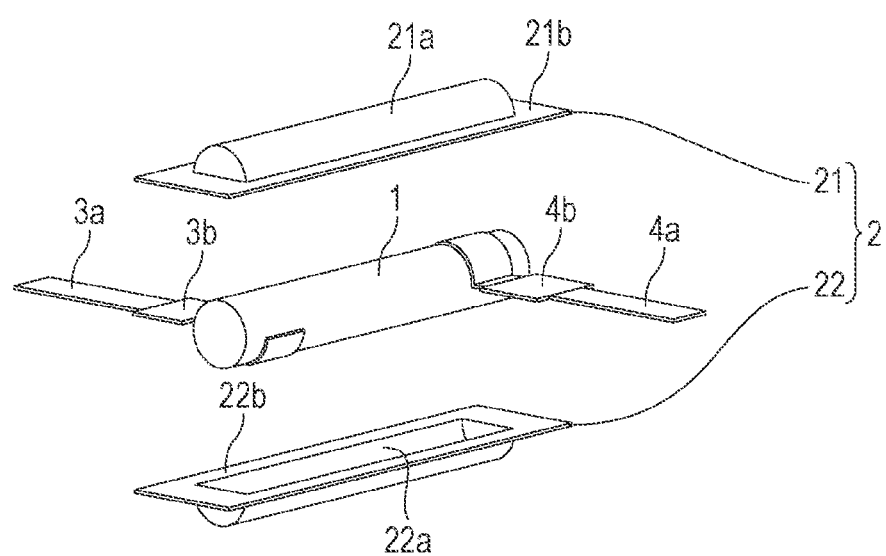
FIG. 16B is an exploded perspective view showing the first example of a configuration of the battery according to the fourth modification example of the first embodiment of the present technology.
Figure 17A:
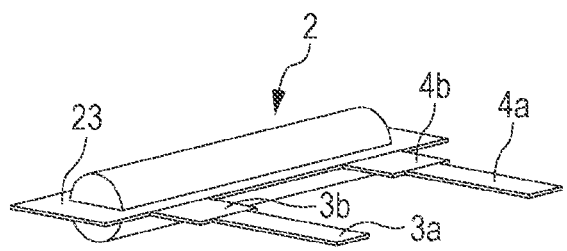
FIG. 17A is a perspective view showing a second example of an appearance of the battery according to the fourth modification example of the first embodiment of the present technology.

In FIG. 16A, an example in which the positive electrode lead 3a and the negative electrode lead 4a are led out to the outside of the sheath material 2 from the joining portions of the different long sides of the sheath material 2 is shown. In FIG. 16B, an example in which the positive electrode lead 3a and the negative electrode lead 4a are led out to the outside of the sheath material 2 from the joining portions of the same long sides of the sheath material 2 is shown. In a case of employing such a configuration, as shown in FIG. 16B, one end of the positive electrode lead 3a and the negative electrode lead 4a is electrically connected so as to follow the peripheral surface of the winding electrode 1, and the other end thereof is led out to the outside of the sheath material 2 which is erected in the direction substantially perpendicular to the peripheral surface of the winding electrode 1.

Figure 17B:
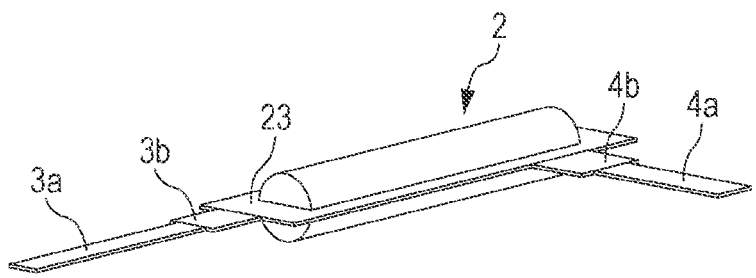
FIG. 17B is a perspective view showing a third example of an appearance of the battery according to the fourth modification example of the first embodiment of the present technology.

In addition, as shown in FIG. 17B, the electrode of one side of the positive electrode lead 3a and the negative electrode lead 4a may be led out to the outside of the sheath material 2 from the joining portions of the short sides of the sheath material 2, and the electrode of the other side thereof may be led out to the outside of the sheath material 2 from the joining portions of the long sides of the sheath material 2.

(Modification Example 5)

Figure 18A:
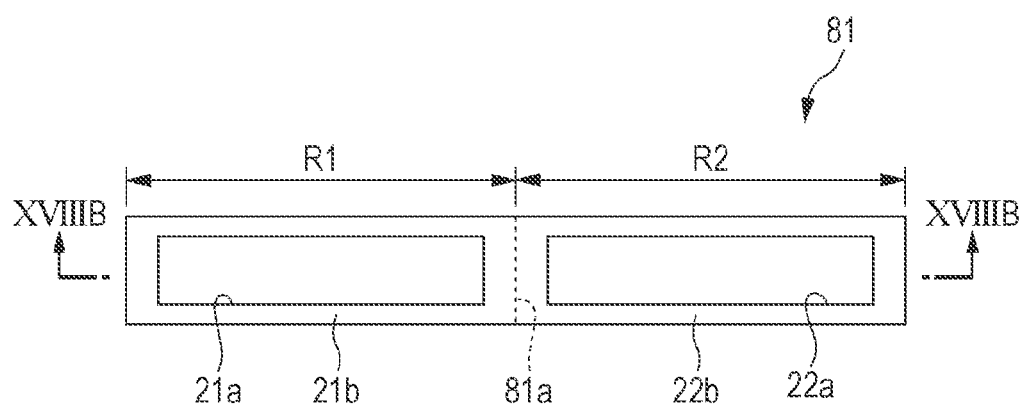
FIG. 18A is a plan view showing an example of a configuration of a sheath material of a battery according to a fifth modification example of the first embodiment of the present technology.
Figure 18B:
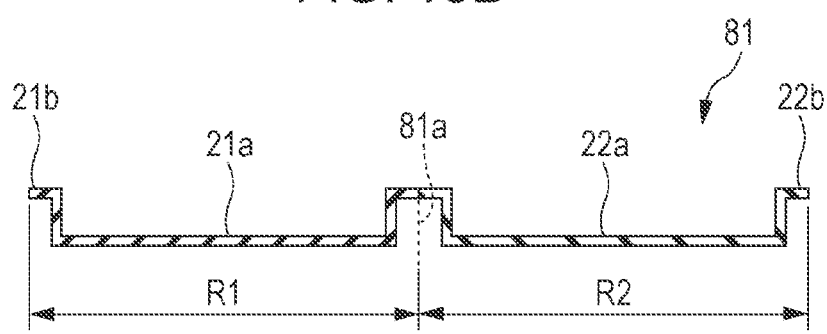
FIG. 18B is a cross-sectional view showing an example of a cross-sectional structure taken along line XVIIIB-XVIIIB of FIG. 18A.

FIG. 18A shows an example of a configuration of a sheath material of a battery according to a fifth modification example of the first embodiment of the present technology. FIG. 18B shows an example of a cross-sectional structure taken along line XVIIIB-XVIIIB of FIG. 18A. The battery according to the fifth modification example is different from the battery according to the first embodiment in the point that the first space portion 21a and the second space portion 22a are provided in one sheath material 81. The sheath material 81 has an elongated rectangular shape, and in the center, a folding portion 81a for folding the sheath material 81 in the longitudinal direction is provided. At the folding portion 81a, for example, a notch extended in the short direction of the sheath material 81 is provided. The first space portion 21a is provided on a housing surface of one side of the sheath material 81 to be folded, and the second space portion 22a is provided on a housing surface of the other side. Moreover, in FIGS. 18A and 18B, an example in which the first space portion 21a and the second space portion 22a are provided some distance away in the longitudinal direction is shown, however, the first space portion 21a and the second space portion 22a may be provided to be adjacent to each other.

Figure 19A:
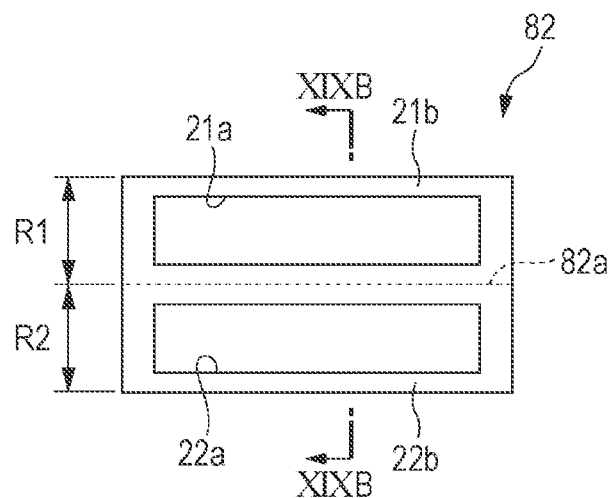
FIG. 19A is a plan view showing another example of a configuration of the sheath material of the battery according to the fifth modification example of the first embodiment of the present technology.
Figure 19B:
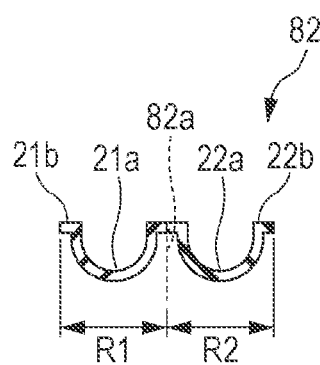
FIG. 19B is a cross-sectional view showing an example of a cross-sectional structure taken along line XIXB-XIXB of FIG. 19A.

In addition, as shown in FIGS. 19A and 19B, the first space portion 21a and the second space portion 22a may be provided in parallel with each other in the sheath material 82. In this case, a folding portion 82a is provided between the first space portion 21a and the second space portion 22a arranged in parallel with each other. The folding portion 82a is extended in the ridge line direction of the first space portion 21a and the second space portion 22a of a substantially semicylindrical shape.

(Modification Example 6)

The battery according to the first embodiment may be produced as described below. First, as described above, the positive electrode 11 and the negative electrode 12 are produced, and the positive electrode lead 3a and the negative electrode lead 4a are attached to the positive electrode 11 and the negative electrode 12, respectively. Next, the positive electrode 11 and the negative electrode 12 through the separator 13 are laminated and wound, and a protective tape is stuck to the outermost periphery portion, whereby a winding body which is a precursor of the winding electrode 1 is formed. Next, the winding body is sandwiched between the sheath material 2, the outer peripheral portion excluding one side is made in a bag shape by heat fusion, and the winding body is accommodated in the sheath material 2. Next, a composition for an electrolyte including a solvent, an electrolyte salt, a monomer which is a raw material of a polymer compound, a polymerization initiator, and, if necessary, other materials such as a polymerization inhibitor is prepared, and the composition is injected in the sheath material 2.

Next, after injecting the composition for electrolyte in the sheath material 2, the opening portion of the sheath material 2 is heat-fused to be sealed in a vacuum atmosphere. Next, by forming a polymer compound by polymerizing the monomers by applying heat, a gel-like electrolyte layer 14 is formed. Thus, the battery of interest can be obtained.

(Modification Example 7)

The battery according to the first embodiment may be produced as described below. In this producing method, the winding electrode 1 is produced in the same manner as in the modification example 6 described above except for using the separator 13 of which both sides are coated with the polymer compound, and is accommodated in the bag-like sheath material 2. For example, the polymer compound which is coated on the separator 13 is a polymer (homopolymer, copolymer, or multi-component copolymer) which has vinylidene fluoride as the component, or the like. Specifically, binary copolymers which have polyvinylidene fluoride, vinylidene fluoride, or hexafluoropropylene as the component, or ternary copolymers which have vinylidene fluoride, hexafluoropropylene, or chlorotrifluoroethylene as the component can be exemplified. Moreover, one or two or more kinds of other polymer compounds may be used together with a polymer which has vinylidene fluoride as the component. Next, after an electrolytic solution is prepared and the electrolytic solution is injected in the sheath material 2, the opening portion of the sheath material 2 is sealed by a heat fusion method. Subsequently, heating is performed while a weight is applied to the sheath material 2, and the separator 13 is brought into close contact with the positive electrode 11 and the negative electrode 12 through the polymer compound. Thus, the electrolytic solution is impregnated into the polymer compound, and the polymer compound is gelled, whereby the electrolyte layer 14 is formed.

(Modification Example 8)

In the first embodiment described above, an example using a gel-like electrolyte was described, however, an electrolytic solution which is an liquid electrolyte may be used instead of the gel-like electrolyte. In this case, for example, the battery may be produced as described below. First, a winding body which is a precursor of the winding electrode 1 is formed in the same manner as in the modification example 6. Next, the winding body is sandwiched between the sheath material 2, the outer peripheral portion excluding one side is made in a bag shape by heat fusion, and the winding body is accommodated in the sheath material 2. Next, an electrolytic solution is prepared, and the electrolytic solution is injected into the sheath material 2, and after the electrolytic solution is impregnated into the winding body, the opening portion of the sheath material 2 is heat-fused to be sealed in a vacuum atmosphere. Thus, the battery of interest can be obtained.

Second Embodiment (2.1 Configuration of Electronic Device)

Figure 20A:
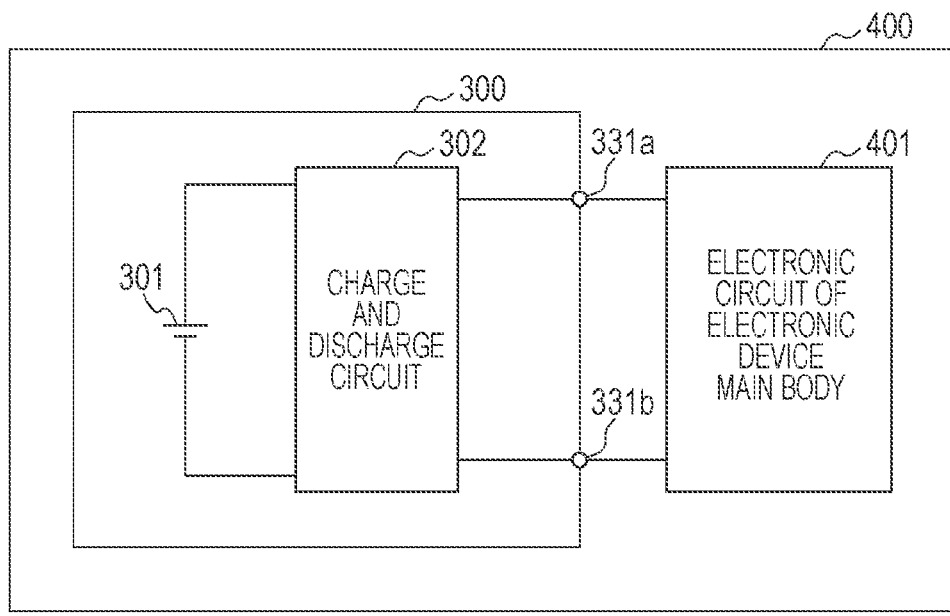
FIG. 20A is a block diagram showing an example of a configuration of an electronic device according to a second embodiment of the present technology.

FIG. 20A is a block diagram showing an example of a configuration of an electronic device according to a second embodiment of the present technology. An electronic device 400 is equipped with an electronic circuit 401 of an electronic device main body and a battery pack 300. The battery pack 300 is electrically connected to the electronic circuit 401. For example, the electronic device 400 has a configuration in which the battery pack 300 can be attached and detached by the user. Moreover, the configuration of the electronic device 400 is not limited thereto, and may be a configuration in which the battery pack 300 is built into the electronic device 400 such that the battery pack 300 may not be removed from the electronic device 400 by the user.

When charging the battery pack 300, each of a positive electrode terminal 331a and a negative electrode terminal 331b of the battery pack 300 is connected to a positive electrode terminal and a negative electrode terminal of the charger (not shown). In contrast, when discharging the battery pack 300 (when using the electronic device 400), each of the positive electrode terminal 331a and the negative electrode terminal 331b of the battery pack 300 is connected to the positive electrode terminal and the negative electrode terminal of the electronic circuit 401.

For example, the electronic device 400 is a portable electronic device. The electronic device 400 may be a wearable electronic device.

Electronic Circuit

For example, the electronic circuit 401 is equipped with a CPU, a peripheral logic portion, an interface portion, memory portion, and the like, and controls the entirety of the electronic device 400.

Battery Pack

The battery pack 300 is equipped with a secondary battery 301 and a charging and discharging circuit 302. As the secondary battery 301, any battery in the first embodiment and the modification examples 1 to 8 described above can be used.

When charging, the charging and discharging circuit 302 controls the charging with respect to the secondary battery 301. In contrast, when discharging (when using the electronic device 400), the charging and discharging circuit 302 controls discharging with respect to the electronic device 400.

(2.2 Modification Examples)

Figure 20B:
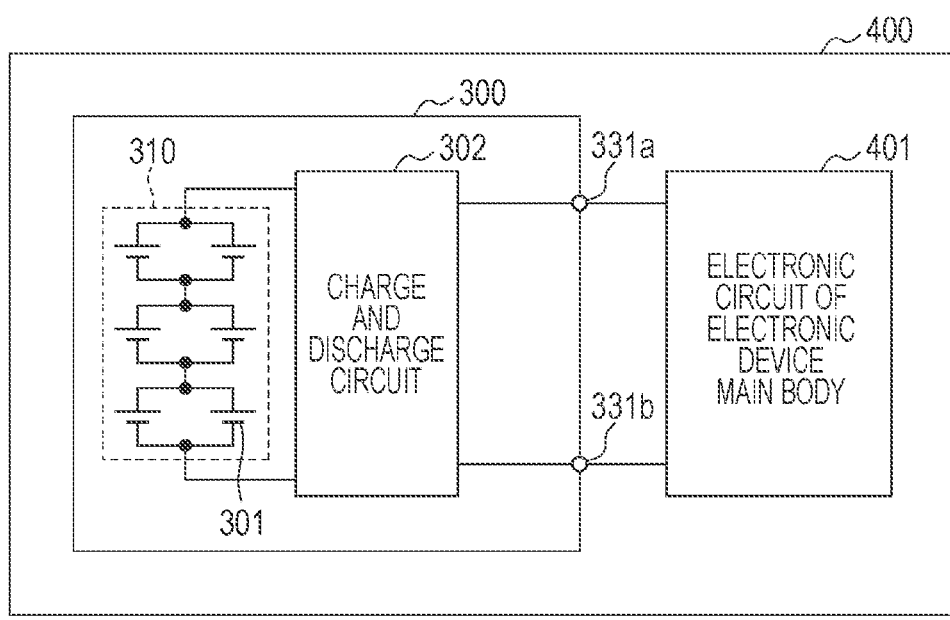
FIG. 20B is a block diagram showing an example of a configuration of an electronic device according to a modification example of the second embodiment of the present technology.

FIG. 21B is a block diagram showing an example of a configuration of an electronic device according to a modification example of the second embodiment of the present technology. In the second embodiment, an assembled battery 310 may be used. The assembled battery 310 is configured by electrically connecting a plurality of the secondary batteries 301 in at least one of parallel and series. For example, the plurality of the secondary batteries 301 are connected n in parallel and m in series (n and m are positive integers). When the plurality of the secondary batteries 301 are electrically connected, for example, the positive electrode lead 3a and the negative electrode lead 4a are used (for example, see FIG. 1A). Moreover, in FIG. 20B, an example in which six secondary batteries 301 are connected 2 in parallel and 3 in series (2P3S) is shown.

The embodiments according to the present technology are described in detail above, but the present technology is not limited to the embodiments described above and various modifications can be made based on the technical idea behind the present technology.

For example, the configurations, methods, processes, shapes, materials, and numerical values exemplified in the above-described embodiments are only examples, and configurations, methods, processes, shapes, materials, and numerical values different from these may be used if necessary.

In addition, the configurations, methods, processes, shapes, materials, and numerical values in the above-described embodiments can be combined with each other without departing from the scope of the present technology.

In addition, the present technology can also employ the following configurations.

(1) A battery equipped with a substantially cylindrical shape winding electrode having a hollow portion in the center, and a sheath material having flexibility which sheathes the winding electrode, in which a width of the hollow portion is 2.5 mm or less.

(2) The battery according to (1) further equipped with a positive electrode lead and a negative electrode lead provided at an outer peripheral portion of the winding electrode.

(3) The battery according to (2), in which the positive electrode lead is led out to the outside of the sheath material from an end portion of one side of the winding electrode, and the negative electrode lead is led out to the outside of the sheath material from an end portion of the other side of the winding electrode.

(4) The battery according to (3), in which the sheath material is joined by sandwiching the positive electrode lead at an end portion side of one side of the winding electrode, and is joined by sandwiching the negative electrode lead at an end portion side of the other side of the winding electrode.

(5) The battery according to (2), in which both of the positive electrode lead and the negative electrode lead are led out to the outside of the sheath material from the end portion of one side of the winding electrode.

(6) The battery according to (5), in which the sheath material is joined by sandwiching the positive electrode lead and the negative electrode lead at the end portion side of one side of the winding electrode.

(7) The battery according to any one of (2) to (6), in which the sheath material is equipped with a first joining portion and a second joining portion provided at a peripheral surface side of the winding electrode, the positive electrode lead and the negative electrode lead are provided on a first half peripheral surface of a peripheral surface of the winding electrode, and the first joining portion and the second joining portion are provided so as to follow a second half peripheral surface of the peripheral surface of the winding electrode.

(8) The battery according to any one of (2) to (7), in which the positive electrode lead and the negative electrode lead are bent substantially perpendicularly to an end surface at the center of the end surface of the winding electrode, and are led out to the outside of the sheath material.

(9) The battery according to any one of (1) to (8), in which the winding electrode is equipped with a positive electrode, a negative electrode, and a separator, and the separator is folded at an inner peripheral side of the winding electrode.

(10) The battery according to any one of (1) to (9), in which the sheath material is a laminated film.

(11) The battery according to any one of (1) to (9), in which the sheath material has a film shape.

(12) The battery according to any one of (1) to (11), in which a thickness of the sheath material at an end surface side of the winding electrode and a thickness of the sheath material at the peripheral surface side of the winding electrode are different.

(13) The battery according to any one of (1) to (12), in which the sheath material is equipped with a first sheath material having a first space portion of a substantially semicylindrical shape and a second sheath material having a second space portion of a substantially semicylindrical shape, a substantially cylindrical shape space portion is configured with the first space portion and the second space portion, and the winding electrode is provided in the space portion.

(14) The battery according to (13), in which each of the positive electrode lead and the negative electrode lead is provided at a position facing a bottom portion of the first space portion or the second space portion in the outer peripheral portion of the winding electrode.

(15) The battery according to any one of (1) to (14), in which the winding electrode is equipped with the positive electrode, the negative electrode, and the separator, and both ends in a width direction of the separator are positioned closer to the outside than both ends in a width direction of the positive electrode and the negative electrode.

(16) The battery according to (15), in which the separator is fused at an end portion of the winding electrode.

(17) The battery according to any one of (1) to (16), in which the winding electrode is equipped with the positive electrode and the negative electrode, and thicknesses of the positive electrode and the negative electrode are 150 micrometers or less.

(18) The battery according to any one of (1) to (17), in which the winding electrode is equipped with an electrolyte including an electrolytic solution and a polymer compound.

(19) The battery according to any one of (1) to (18) further equipped with a winding stop portion covering one turn or more of the peripheral surface of the winding electrode, in which the winding stop portion covers at least both end portions of the peripheral surface of the winding electrode.

(20) An assembled battery which is equipped with the battery according to any one of (1) to (19).

(21) An electronic device which is equipped with the battery according to any one of (1) to (19).

In addition, the present technology can also employ the following configurations.

(1) A battery, comprising:
a substantially cylindrically shaped winding electrode having a hollow portion in the center; and
a sheath material having flexibility which sheathes the winding electrode,
wherein a width of the hollow portion is 2.5 mm or less.

(2) The battery according to (1), wherein the hollow portion is substantially cylindrically shaped with a diameter of 2.5 mm or less that extends along a central axis of the winding electrode.

(3) The battery according to (1), further comprising:
a positive electrode lead and a negative electrode lead both provided at an outer peripheral portion of the winding electrode.

(4) The battery according to (3),
wherein the positive electrode lead is led out to the outside of the sheath material from an end portion of one side of the winding electrode, and
the negative electrode lead is led out to the outside of the sheath material from an end portion of the other side of the winding electrode.

(5) The battery according to (4),
wherein the sheath material is joined by sandwiching the positive electrode lead at an end portion side of one side of the winding electrode, and is joined by sandwiching the negative electrode lead at an end portion side of the other side of the winding electrode.

(6) The battery according to (3),
wherein both of the positive electrode lead and the negative electrode lead are led out to the outside of the sheath material from the end portion of one side of the winding electrode.

(7) The battery according to (6),
wherein the sheath material is joined by sandwiching the positive electrode lead and the negative electrode lead at the end portion side of one side of the winding electrode.

(8) The battery according to (3),
wherein the sheath material is equipped with a first joining portion and a second joining portion provided at a peripheral surface side of the winding electrode,
the positive electrode lead and the negative electrode lead are provided on a first half peripheral surface side of a peripheral surface of the winding electrode, and
the first joining portion and the second joining portion are provided so as to follow a second half peripheral surface of the peripheral surface of the winding electrode.

(9) The battery according to (3),
wherein the positive electrode lead and the negative electrode lead are bent substantially perpendicularly to an end surface at the center of the end surface of the winding electrode, and are led out to the outside of the sheath material.

(10) The battery according to (1),
wherein the winding electrode is equipped with a positive electrode, a negative electrode, and a separator, and
the separator is folded at an inner peripheral side of the winding electrode.

(11) The battery according to (1),
wherein the winding electrode is equipped with a positive electrode, a negative electrode, and a separator, and
wherein ends of the separator are provided at an outer peripheral side of the winding electrode.

(12) The battery according to (1),
wherein the sheath material is a laminated film.

(13) The battery according to (1),
wherein the sheath material has a film shape.

(14) The battery according to (1),
wherein a thickness of the sheath material at an end surface side of the winding electrode and a thickness of the sheath material at the peripheral surface side of the winding electrode are different from each other.

(15) The battery according to (1),
wherein the sheath material is equipped with
a first sheath material having a first space portion of a substantially semicylindrical shape,
a second sheath material having a second space portion of a substantially semicylindrical shape, and
a substantially cylindrical shape space portion is configured with the first space portion and the second space portion, and the winding electrode is provided in the space portion.

(16) The battery according to (5),
wherein each of the positive electrode lead and the negative electrode lead is provided at a position facing a bottom portion of the first space portion or the second space portion in the outer peripheral portion of the winding electrode.

(17) The battery according to (1),
wherein the winding electrode is equipped with the positive electrode, the negative electrode, and the separator, and
both ends in a width direction of the separator are positioned closer to the outside than both ends in a width direction of the positive electrode and the negative electrode.

(18) The battery according to (17),
wherein the separator is fused at an end portion of the winding electrode.

(19) The battery according to (1),
wherein the winding electrode is equipped with the positive electrode and the negative electrode, and
thicknesses of the positive electrode and the negative electrode are 150 micrometers or less.

(20) The battery according to (1),
wherein the winding electrode is equipped with an electrolyte including an electrolytic solution and a polymer compound.

(21) The battery according to (1), further comprising:
a winding stop portion covering one turn or more of the peripheral surface of the winding electrode,
wherein the winding stop portion covers at least both end portions of the peripheral surface of the winding electrode.

(22) An assembled battery, comprising:
a plurality of batteries electrically connected in at least one of parallel and series, wherein the batteries are equipped with a substantially cylindrically shaped winding electrode having a hollow portion in the center and a sheath material having flexibility which sheathes the winding electrode, and a width of the hollow portion is 2.5 mm or less.

(23) The assembled battery according to (22), wherein the hollow portion is substantially cylindrically shaped with a diameter of 2.5 mm or less that extends along a central axis of the winding electrode.

(24) A method of manufacturing a winding electrode for a battery, the method comprising:
inserting a separator into a gap of a winding core;
winding the winding core to wind two portions of the separator around an outer peripheral surface of the winding core;
wherein at least one electrode is stacked on the separator and
removing the winding core to leave a hollow portion in a central portion of the winding electrode,
wherein the winding electrode is substantially cylindrically shaped, and wherein the hollow portion is substantially cylindrically shaped with a diameter of 2.5 mm or less that extends along a central axis of the winding electrode.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Winding electrode
2 Sheath material
3a Positive electrode lead
3b Negative electrode lead
4a, 4b Sealant material
5a, 5b Winding stop portion
11 Positive electrode
11A Positive electrode current collector
11B Positive electrode active material layer
11C Positive electrode current collector-exposed portion
12 Negative electrode
12A Negative electrode current collector
12B Negative electrode active material layer
12C Negative electrode current collector-exposed portion
13 Separator
14 Electrolyte layer
15 Protective layer
21 First sheath material
21a First space portion
22 Second sheath material
22a Second space portion

The invention claimed is:

1. A battery, comprising:
a substantially cylindrically shaped winding electrode having a hollow portion in the center; and
a sheath material having flexibility which sheathes the winding electrode,
wherein a width of the hollow portion is 2.5 mm or less,
wherein the sheath material includes a first sheath material and a second sheath material,
wherein the first sheath material includes a first space portion having a substantially semicylindrical shape and a first peripheral portion extending from four sides of the first space portion,
wherein the second sheath material includes a second space portion having the substantially semicylindrical shape and a second peripheral portion extending from four sides of the second space portion, and
wherein the first sheath material has a substantially same shape as the second sheath material.

2. The battery according to claim 1, wherein the hollow portion is substantially cylindrically shaped with a diameter of 2.5 mm or less that extends along a central axis of the winding electrode.

3. The battery according to claim 1, further comprising:
a positive electrode lead and a negative electrode lead both provided at an outer peripheral portion of the winding electrode.

4. The battery according to claim 3,
wherein the positive electrode lead is led out to the outside of the sheath material from an end portion of one side of the winding electrode, and
the negative electrode lead is led out to the outside of the sheath material from an end portion of the other side of the winding electrode.

5. The battery according to claim 4,
wherein the sheath material is joined by sandwiching the positive electrode lead at an end portion side of one side of the winding electrode, and is joined by sandwiching the negative electrode lead at an end portion side of the other side of the winding electrode.

6. The battery according to claim 3,
wherein both of the positive electrode lead and the negative electrode lead are led out to the outside of the sheath material from the end portion of one side of the winding electrode.

7. The battery according to claim 6,
wherein the sheath material is joined by sandwiching the positive electrode lead and the negative electrode lead at the end portion side of one side of the winding electrode.

8. The battery according to claim 3,
wherein the sheath material is equipped with a first joining portion and a second joining portion provided at a peripheral surface side of the winding electrode,
the positive electrode lead and the negative electrode lead are provided on a first half peripheral surface side of a peripheral surface of the winding electrode, and
the first joining portion and the second joining portion are bent so as to follow a second half peripheral surface of the peripheral surface of the winding electrode.

9. The battery according to claim 3,
wherein the positive electrode lead and the negative electrode lead are bent substantially perpendicularly to an end surface at the center of the end surface of the winding electrode, and are led out to the outside of the sheath material.

10. The battery according to claim 1,
wherein the winding electrode is equipped with a positive electrode, a negative electrode, and a separator, and
the separator is folded at an inner peripheral side of the winding electrode.

11. The battery according to claim 1,
wherein the winding electrode is equipped with a positive electrode, a negative electrode, and a separator, and
wherein ends of the separator are provided at an outer peripheral side of the winding electrode.

12. The battery according to claim 1,
wherein the sheath material is a laminated film.

13. The battery according to claim 1,
wherein the sheath material has a film shape.

14. The battery according to claim 1,
wherein a thickness of the sheath material at an end surface side of the winding electrode and a thickness of the sheath material at the peripheral surface side of the winding electrode are different from each other.

15. The battery according to claim 5,
wherein each of the positive electrode lead and the negative electrode lead is provided at a position facing a bottom portion of the first space portion or the second space portion in the outer peripheral portion of the winding electrode.

16. The battery according to claim 1,
wherein the winding electrode is equipped with the positive electrode, the negative electrode, and the separator, and
both ends in a width direction of the separator are positioned closer to the outside than both ends in a width direction of the positive electrode and the negative electrode.

17. The battery according to claim 16,
wherein the separator is fused at an end portion of the winding electrode.
18. The battery according to claim 1,
wherein the winding electrode is equipped with the positive electrode and the negative electrode, and
thicknesses of the positive electrode and the negative electrode are 150 micrometers or less.
19. The battery according to claim 1,
wherein the winding electrode is equipped with an electrolyte including an electrolytic solution and a polymer compound.
20. The battery according to claim 1, further comprising:
a winding stop portion covering one turn or more of the peripheral surface of the winding electrode,
wherein the winding stop portion covers at least both end portions of the peripheral surface of the winding electrode.
21. An assembled battery, comprising:
a plurality of batteries electrically connected in at least one of parallel and series,
wherein the batteries are equipped with a substantially cylindrically shaped winding electrode having a hollow portion in the center and a sheath material having flexibility which sheathes the winding electrode, and a width of the hollow portion is 2.5 mm or less,
wherein the sheath material includes a first sheath material and a second sheath material,
wherein the first sheath material includes a first space portion having a substantially semicylindrical shape and a first peripheral portion extending from four sides of the first space portion,
wherein the second sheath material includes a second space portion having the substantially semicylindrical shape and a second peripheral portion extending from four sides of the second space portion, and
wherein the first sheath material has a substantially same shape as the second sheath material.
22. The assembled battery according to claim 21, wherein the hollow portion is substantially cylindrically shaped with a diameter of 2.5 mm or less that extends along a central axis of the winding electrode.

* * * * *